United States Patent
Anikin et al.

(10) Patent No.: US 12,139,147 B2
(45) Date of Patent: Nov. 12, 2024

(54) DRIVER PROFILING AND IDENTIFICATION

(71) Applicant: Harman Connected Services, Inc., Mountain View, CA (US)

(72) Inventors: Vladimir Anikin, Nizhniy Novgorod (RU); Roman Isaev, Nizhniy Novgorod (RU); Vladimir Tyutin, Nizhniy Novgorod (RU)

(73) Assignee: HARMAN CONNECTED SERVICES, INC., Mountain View, CA (US)

( * ) Notice: Subject to any disclaimer, the term of this patent is extended or adjusted under 35 U.S.C. 154(b) by 986 days.

(21) Appl. No.: 17/049,171

(22) PCT Filed: Oct. 25, 2018

(86) PCT No.: PCT/US2018/057517
§ 371 (c)(1),
(2) Date: Oct. 20, 2020

(87) PCT Pub. No.: WO2019/209370
PCT Pub. Date: Oct. 31, 2019

(65) Prior Publication Data
US 2021/0229674 A1    Jul. 29, 2021

(30) Foreign Application Priority Data
Apr. 23, 2018 (RU) .................. 2018114981

(51) Int. Cl.
*B60W 40/09* (2012.01)
*B60W 40/08* (2012.01)
(Continued)

(52) U.S. Cl.
CPC ............ *B60W 40/09* (2013.01); *B60W 50/14* (2013.01); *G06F 16/2468* (2019.01);
(Continued)

(58) Field of Classification Search
CPC ................ B60W 40/09; B60W 50/14; B60W 2040/0809; B60W 2050/146;
(Continued)

(56) References Cited

U.S. PATENT DOCUMENTS 6,988,034 B1 * 1/2006 Marlatt ................. G06Q 10/02
2005/0222730 A1 * 10/2005 Taipale ................ B60R 25/255
(Continued)

FOREIGN PATENT DOCUMENTS

CN     104768130 A     7/2015
CN     105365708 A     3/2016
(Continued)

OTHER PUBLICATIONS

ISA European Patent, International Search Report and Written Opinion Issued in Application No. PCT/US2018/057517, Mar. 18, 2019, WIPO, 18 pages.
(Continued)

*Primary Examiner* — Elaine Gort
*Assistant Examiner* — Ellis B. Ramirez
(74) *Attorney, Agent, or Firm* — McCoy Russell LLP

(57) ABSTRACT

Embodiments are disclosed for an automatic identification of a driver. In one example, an in-vehicle computing system of a vehicle includes a sensor interface communicatively coupled to one or more data collection devices, a processor, and a storage device storing instructions executable by the processor to generate a two-dimensional current driver profile matrix for a current driver of the vehicle, the current driver profile matrix indicating a vehicle operating status in terms of a pair of driving parameters at sampled times during a current vehicle trip, and determine a probability that the current driver is one of a plurality of known drivers by
(Continued)

comparing the current driver profile matrix to one or more stored driver profile matrices associated with the plurality of known drivers.

20 Claims, 9 Drawing Sheets

(51) Int. Cl.
    *B60W 50/14*     (2020.01)
    *G06F 16/2458*     (2019.01)
    *G06F 16/9035*     (2019.01)

(52) U.S. Cl.
    CPC . *G06F 16/9035* (2019.01); *B60W 2040/0809* (2013.01); *B60W 2050/146* (2013.01); *B60W 2510/0638* (2013.01); *B60W 2510/1005* (2013.01); *B60W 2520/10* (2013.01); *B60W 2520/105* (2013.01); *B60W 2520/125* (2013.01); *B60W 2540/10* (2013.01); *B60W 2540/103* (2013.01); *B60W 2540/16* (2013.01)

(58) Field of Classification Search
    CPC . B60W 2510/0638; B60W 2510/1005; B60W 2520/10; B60W 2520/105; B60W 2520/125; B60W 2540/10; B60W 2540/103; B60W 2540/16; G06F 16/2468; G06F 16/9035; B60R 25/33
    USPC .......... 701/1, 32.6, 33.4, 430, 527; 340/439, 340/425.5, 426.16
    See application file for complete search history.

(56) References Cited

U.S. PATENT DOCUMENTS

| | | | |
|---|---|---|---|
| 2007/0136040 A1* | 6/2007 | Tate | B60W 40/09 |
| 2013/0041521 A1 | 2/2013 | Basir et al. | |
| 2013/0096731 A1* | 4/2013 | Tamari | G06F 11/3058 |
| 2015/0045984 A1* | 2/2015 | Hui | B60N 2/002 |
| | | | 701/1 |
| 2015/0191178 A1 | 7/2015 | Roy et al. | |
| 2016/0101783 A1* | 4/2016 | Abou-Nasr | B60R 16/037 |
| 2016/0347325 A1* | 12/2016 | Phillips | G07C 5/02 |
| 2017/0147935 A1 | 5/2017 | Bai et al. | |
| 2017/0323212 A1* | 11/2017 | Volkov | G06N 5/04 |
| 2018/0012092 A1 | 1/2018 | Gleeson-May et al. | |
| 2018/0237026 A1* | 8/2018 | Chowdhury | G07C 5/008 |
| 2019/0111934 A1* | 4/2019 | Shin | B60W 40/08 |
| 2019/0185009 A1* | 6/2019 | Werner | G06N 5/022 |
| 2019/0283773 A1* | 9/2019 | Mori | B60W 50/10 |

FOREIGN PATENT DOCUMENTS

| | | |
|---|---|---|
| CN | 107220582 A | 9/2017 |
| EP | 2891589 A2 | 7/2015 |

OTHER PUBLICATIONS

Saiprasert, C. et al., "Remote Driver Identification Using Minimal Sensory Data," IEEE Communications Letter, vol. 19, No. 10, Oct. 2015, 4 pages.
European Patent Office, Office Action Issued in Application No. 18800018.6, Mar. 22, 2023, Germany, 6 pages.
Intellectual Property India, Examination Report Issued in Application No. 202047046279, May 17, 2022, 6 pages.

* cited by examiner

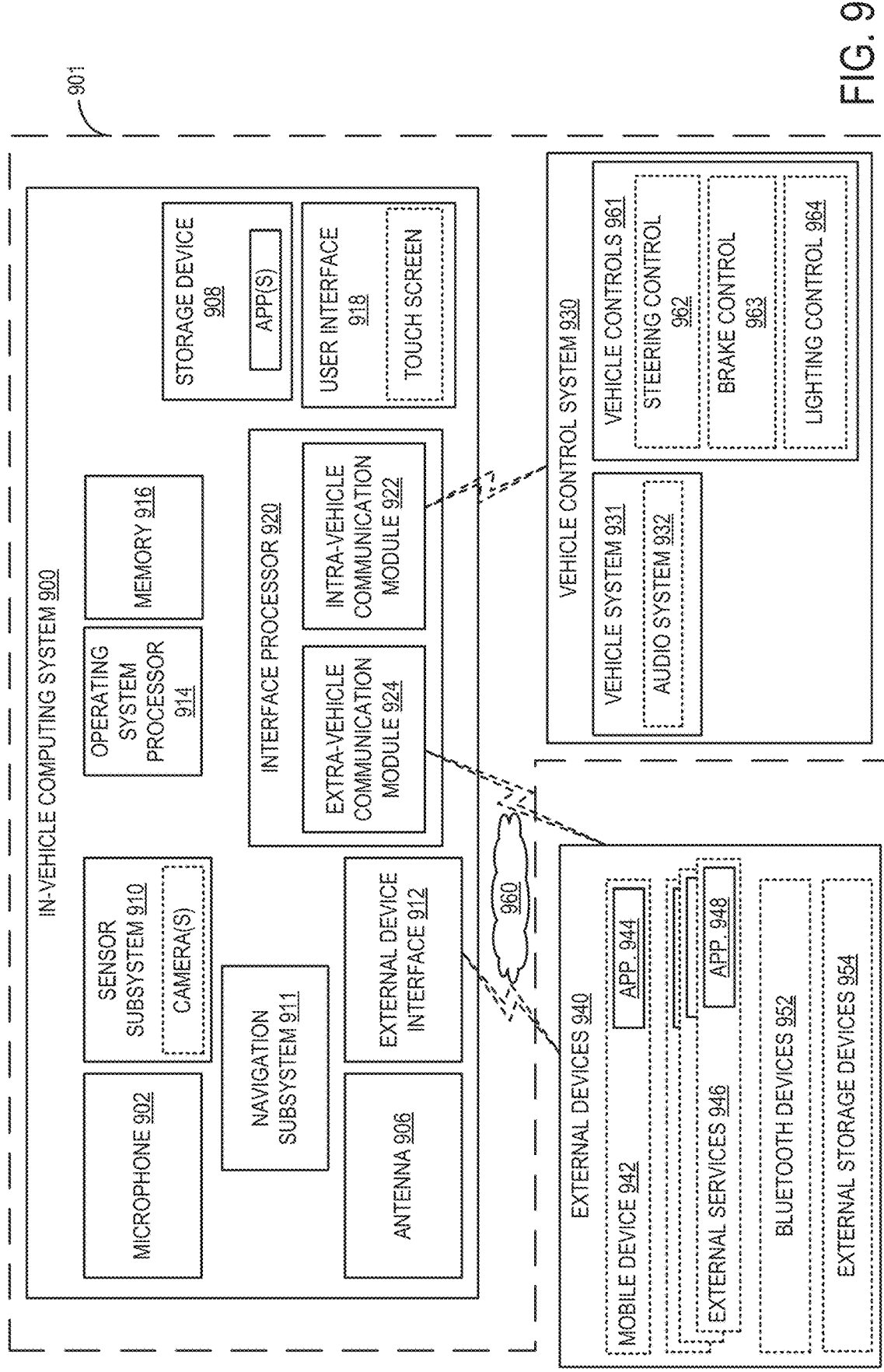

DRIVER PROFILING AND IDENTIFICATION

CROSS-REFERENCE TO RELATED APPLICATIONS

The present application is a U.S. National Phase of International Patent Application Serial No. PCT/US18/57517 entitled "DRIVER PROFILING AND IDENTIFICATION," filed on Oct. 25, 2018. International Patent Application Serial No. PCT/US18/57517 claims priority to Russian Patent Application No. 2018114981, entitled "DRIVER PROFILING AND IDENTIFICATION", filed on Apr. 23, 2018. The entire contents of each of the above-referenced applications are hereby incorporated by reference for all purposes.

FIELD

The disclosure relates to identifying a driver in a vehicle based on monitored driving information.

BACKGROUND

User identification may be performed in various contexts to control access to a system or to personalize a user experience. For example, a user may log in to a secured system by inputting user credentials (e.g., a user name and password) or by performing a biometric scan (e.g., facial or retinal recognition, fingerprint scanning, etc.). In each of these cases, the user is identified based on information that is directly input and only used for the purposes of identification.

SUMMARY

In vehicle contexts, direct input of user information to identify a driver of a vehicle may interfere with the driving experience and utilize valuable computing resources. Furthermore, divorcing the input of user identification information from the action of driving results in a vulnerability in which a driver may be incorrectly identified for a particular vehicle trip (e.g., where a first user inputs identifying information before starting a trip, and a second user actually drives the vehicle during the trip).

The disclosure provides for a driver identification system that utilizes driving behavior information to infer a driver identity. Embodiments are disclosed for an in-vehicle computing system of a vehicle. In one example, an in-vehicle computing system includes a sensor interface communicatively coupled to one or more data collection devices, a processor, and a storage device storing instructions executable by the processor to generate a two-dimensional current driver profile matrix for a current driver of the vehicle, the current driver profile matrix indicating a vehicle operating status in terms of a pair of driving parameters at sampled times during a current vehicle trip, and determine a probability that the current driver is one of a plurality of known drivers by comparing the current driver profile matrix to one or more stored driver profile matrices associated with the plurality of known drivers.

Embodiments are also disclosed for a method of inferring an identity of a driver of a vehicle with a driver identification system. In one example, a method includes adjusting a vehicle parameter responsive to an automatic identification of a driver of the vehicle from among a limited number of drivers, the automatic identification based upon a probability correlation of at least two driving parameters sampled repeatedly over time during a current vehicle trip to stored data associated with the limited number of drivers based on one or more previous drives.

Embodiments are also disclosed for a driver identification system of a vehicle. In one example, a driver identification system includes a display, a sensor interface communicatively coupled to one or more data collection devices, a processor, and a storage device storing instructions executable by the processor to receive, via the sensor interface, driving data from the one or more data collection devices, the driving data including an indication of parameters of a vehicle operating status during a vehicle trip, and generate a current driver profile matrix for a current driver of the vehicle, the current driver profile matrix mapping values of a first parameter of the vehicle operating status to values of a second parameter of the vehicle operating status using the driving data. The instructions are also executable to compare the current driver profile matrix to one or more stored driver profile matrices, each of the one or more stored driver profile matrices associated with a respective known driver, for each respective known driver, determine a probability that the current driver is the respective known driver, and output, via the display, an indication of a driver identifier associated with a selected known driver, wherein the probability that the current driver is the selected known driver is higher than the probability that the current driver is any other one of the respective known drivers.

BRIEF DESCRIPTION OF THE DRAWINGS

The disclosure may be better understood from reading the following description of non-limiting embodiments, with reference to the attached drawings, wherein below:

FIG. 9 shows a block diagram of an in-vehicle computing system in accordance with one or more embodiments of the present disclosure.

DETAILED DESCRIPTION

Figure 1:
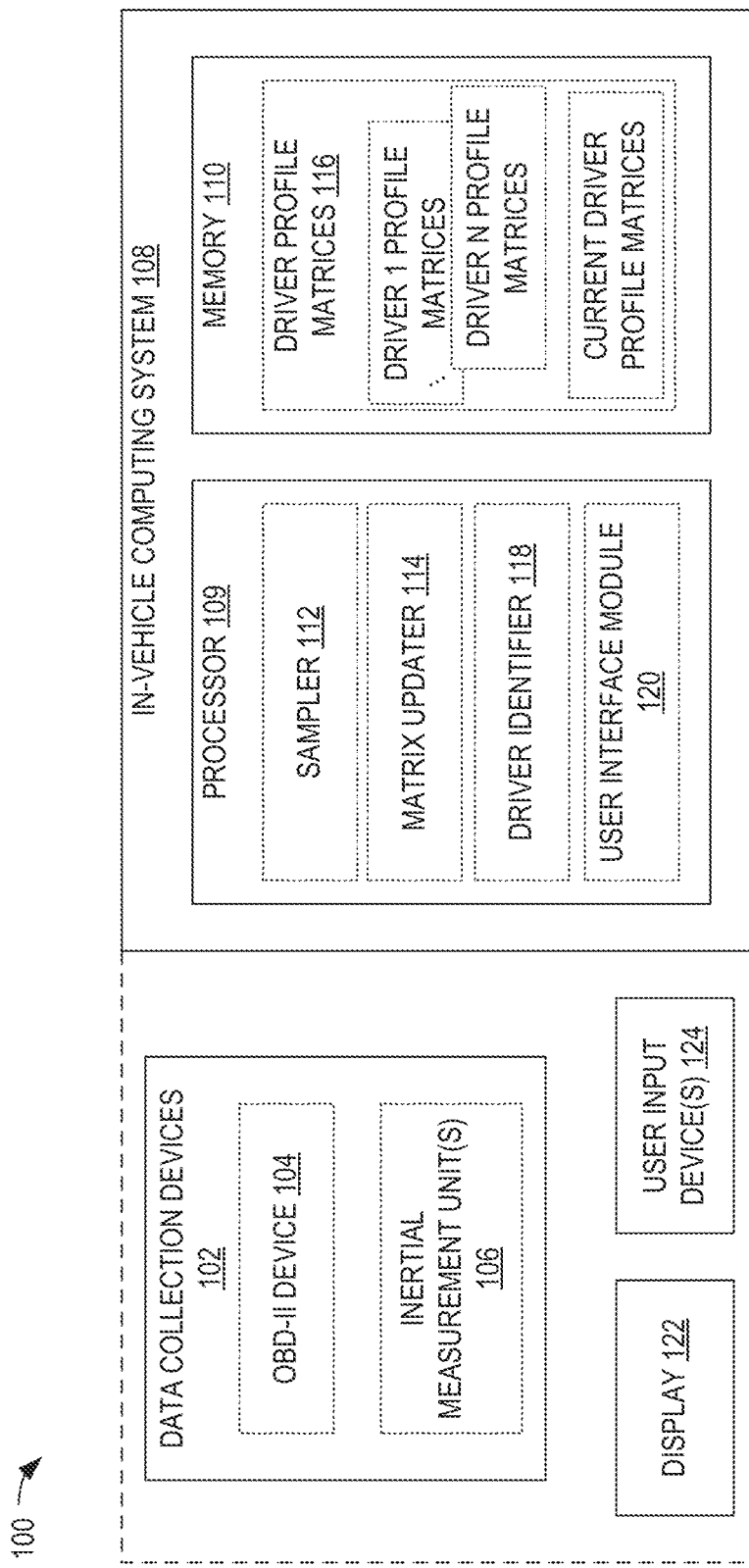
FIG. 1 shows a block diagram of an example driver identification system in accordance with one or more embodiments of the present disclosure.

Vehicles may be driven by multiple drivers in both commercial and private contexts. For example, drivers for a commercial transportation company or other commercial entity may be assigned to different vehicles based on vehicle availability, capabilities, and other parameters. Similarly, vehicles owned or otherwise used by a family unit or other domestic arrangement may be driven by multiple drivers (e.g., parents and a driving-age child). As still another example, vehicles used for rentals or car share programs are driven by multiple drivers. For each multiple driver scenario, identifying a driver of a vehicle for a given driving trip may be helpful to provide accountability for the trip, to provide a targeted user experience during the trip, and/or to otherwise increase statistical data related to a given vehicle and/or driver.

In some systems, a driver may directly input a driver identifier (e.g., sign in, provide voice, facial, or other biometric input) or provide a mechanism for the vehicle to directly identify the driver before or during a trip (e.g., via a radio-frequency identifier chip or other detectable device). However, such driver identification mechanisms may be time-consuming, easily forgotten, and/or manipulated so as to provide an inaccurate account of the driver during a particular trip (e.g., a user who is not the driver for a particular trip may provide input for a biometric scan so as to be incorrectly associated with the particular trip). Accordingly, the disclosure provides mechanisms for identifying a driver for a vehicle trip using driving behavior recorded during the vehicle trip. The disclosed mechanisms may utilize a reduced number/amount of sensors and computing resources relative to mechanisms that use direct user input and/or data from numerous on-board sensors. For example, as will be disclosed in more detail below, driver profiles associated with each of a plurality of drivers may be formed by one or more two-dimensional matrices having rows corresponding to values of a first parameter and columns corresponding to values of a second parameter, the first and second parameters relating to vehicle operating parameters (e.g., vehicle speed, vehicle acceleration, accelerator pedal position, engine RPM, etc.). Each cell of each matrix may include a counter that is incremented each time the vehicle is observed (e.g., during a calibration/training/learning phase for a selected driver) operating at a first parameter value and a second parameter value associated with that cell. Examples of matrices are described in more detail below.

During an identification phase, observed vehicle operation may be compared to the matrices of the driver profiles in order to determine probabilities of a current driver matching drivers associated with each driver profile. If the driving behavior of a current driver is calculated as having a probability of matching a selected driver profile that is higher than a threshold and higher than the probability of matching any other driver profile, the current driver may be identified as the driver associated with the selected driver profile. In some examples, only an indication of a name or other identifier of a driver identified by the system and/or a probability of match of a current driver to the identified driver may be displayed to a user (e.g., via an in-vehicle display or display connected to a backend/web server storing information from the driver identification system). In other examples, additional information, such as graphical representations of the driver profiles and the driving behavior of the current driver may be displayed to a user (e.g., via an in-vehicle display or display connected to a backend/web server storing information from the driver identification system) to provide confirmation of the identification and/or to monitor use of the associated vehicle. The matrix-based approach to driver identification described herein may increase the efficiency of a computing system performing the identification (e.g., relative to other mechanisms that utilize input from different sensors and/or store raw observation data) by reducing the storage footprint of the tracked information and reducing a seek time for matching vehicle behaviors observed in an identification phase to vehicle behaviors observed in a training phase. For example, each driver profile may be approximately 100 kilobytes in size, which is smaller than raw sensor data, such as image sensor data, that may be used to directly identify a driver.

As noted above, the driver identification disclosed herein may utilize fewer sensors than other systems, which may rely on direct user input mechanisms (e.g., image sensors, touch screens, microphones, buttons or other user-actuatable elements, etc.) or numerous vehicle sensors. As shown in FIG. 1, the disclosure provides for a driver identification system 100 that may perform driver identification for a driver of a vehicle using only two data collection devices 102—an on-board diagnostic II (OBD-II) device 104 and an inertial measurement unit(s) (IMU) 106 such as an accelerometer and/or gyroscope. THE OBD-II device 104 may be a standalone dongle (e.g., an ELM-327 dongle) that is coupled to the vehicle via a physical or wireless connection (e.g., Universal Serial Bus [USB], RS-232, Bluetooth, Wi-Fi, etc.) to provide an interface for receiving OBD data from the vehicle. In some examples, the OBD-II device may be implemented by an application executed on a mobile device (e.g., a smartphone, tablet, or laptop) that is connected to the vehicle via a physical or wireless connection. The OBD-II device may be coupled to an in-vehicle computing system 108 of the vehicle, which may include or be included in a head unit and/or a telematics unit of the vehicle. In other examples, the OBD-II device may be included in the in-vehicle computing system 108 and/or the ODB data may be read by a telematics unit or head unit of the vehicle. The OBD-II device may collect data including vehicle speed, engine RPM, accelerator pedal position, gear shift timings, etc.

The IMU(s) 106 may include one or more microelectromechanical system (MEMS) accelerometers and/or MEMS gyroscopes. The IMU(s) 106 may optionally be integrated with the OBD-II device 104, or may be a separate sensor independent from the OBD-II device. In some examples, the IMU(s) 106 may be included in the in-vehicle computing system and/or a telematics unit or head unit of the vehicle. The IMU(s) 106 may measure acceleration information, including forward acceleration, reverse acceleration, and lateral acceleration (acceleration in a direction that is perpendicular to the forward and reverse acceleration measurements, such as turning acceleration/movement).

The in-vehicle computing system 108 includes a processor 109 and memory 110. Although schematically illustrated as part of processor 109, it is to be understood that various modules (e.g., modules 112-120, described below) of the processor may include instructions stored in memory that are executable by the processor to perform the associated actions. For example, processor 109 may include a sampler 112 configured to receive data from the data collection devices 102 and parse the received data into samples that are passed to the matrix updater 114. For example, OBD data may be collected from the OBD-II device 104 with a 2 hertz frequency and data from the IMUs 106 may be collected with a 10 hertz frequency.

The matrix updater 114 may be configured to increment a counter in one or more cells of one or more driver profile matrices (e.g., one or more matrices of driver profile matrices 116) based on the sampled data. For example, the sampled data may include values for multiple vehicle parameters, such as a speed and acceleration at a given time. In such an example, the matrix updater 114 may increment a counter in a cell corresponding to the sampled speed and acceleration value within a speed/acceleration matrix associated with a current driver. For example, the row of the cell may be determined by the sampled value of a first parameter (e.g., speed) and the column of the cell may be determined by the sampled value of a second parameter (e.g., acceleration). In a training phase, the current driver may be a known driver, such as one of driver 1 through driver N (where there are N stored driver profiles). In an identification phase, the current driver may be an unknown driver, whose matrices are stored as current driver profile matrices and later compared to the stored driver profile matrices for drivers 1 through N. The current driver profile matrices may be implemented as a buffer, such that information is only stored until a given identification phase is complete (e.g., an identification phase trip is ended with a vehicle shut down event or other trigger, and/or a current driver is identified by comparison to the stored profile matrices for drivers 1 through N) and/or until a new identification phase is started (e.g., with a vehicle start up event or other trigger). In other examples, a predetermined number of current driver profile matrices may be stored, such that a current driver profile matrix is only overwritten when each of the predetermined number of current driver profile matrices have been used. In such examples, the matrices may be overwritten in a first in/first out manner (e.g., a current driver profile matrix having the oldest data stored therein is overwritten first).

Using multiple driver profile matrices to statistically model driving behaviors reduces the driver profile memory size, decreases seek/update time for building the driver profiles, and decreases driver identification time (e.g., time to compare a current driver profile to other stored driver profiles). The driver profile matrices may also be configured to characterize drivers by most common behaviors of the drivers, such as most common accelerations and decelerations, hard and soft turns, preferable accelerator pedal positions, etc. An example representation of a matrix for speed versus acceleration for a driver profile is presented in Table 1 below:

TABLE 1

|  | Decelerations | | | Accelerations | | |
| --- | --- | --- | --- | --- | --- | --- |
| OBD Speed | −5 m/s^2 | −4.9 m/s^2 | . . . | 0 m/s^2 | . . . | 4.9 m/s^2 | 5 m/s^2 |
| 150 Km/h | 0 | 0 | . . . | 0 | . . . | 0 | 0 |
| 149 km/h | 0 | 0 | . . . | 4 | . . . | 0 | 0 |
| . . . | . . . | . . . | . . . | . . . | . . . | . . . | . . . |
| . . . | . . . | . . . | . . . | . . . | . . . | . . . | . . . |
| 1 km/h | 5 | 245 | . . . | 1564 | . . . | 130 | 32 |
| 0 km/h | 12 | 134 | . . . | 1875 | . . . | 12 | 0 |

It is to be understood that Table 1 is truncated to show different portions of the example matrix, and that each matrix of each driver profile may be much larger. An example matrix size may be 150 rows by 100 columns. For example, for a speed versus acceleration profile, the row number may be calculated from a speed value and vary from 0 to 149 (from 0 to 149 km/h). The column numbers may be calculated from vehicle acceleration (or deceleration) and may vary from 0 to 99 where the 0 column is an acceleration of $-5$ m/s$^2$ and the 99th column is an acceleration of 5 m/s$^2$. In some examples the number of rows and columns may be selected as a function of the parameters modeled by the matrix and/or the range of data presented in the matrix (e.g., the range of data received during a training phase). It is to be understood that speed, as used herein, refers to vehicle speed unless otherwise indicated, and RPM, as used herein, refers to engine RPM unless otherwise indicated.

Values in the cells of the example matrix may be counters representing a number of matches of an associated speed and acceleration (e.g., rounding up, down, or to the nearest value pair represented in the matrix). In an example scenario where the matrix of Table 1 is associated with a stored profile for driver 1, the value "245" in the cell corresponding to 1 km/h and −4.9 m/s$^2$ indicates that driver 1 was monitored as decelerating at a rate of −4.9 m/s$^2$ while at a speed of 1 km/h 245 times and/or for 245 of the received data samples (e.g., since the driver profile for driver 1 was initialized). Each driver profile for each driver may have multiple matrices.

As described above, the driver profile matrices may include both stored matrices for a plurality of drivers (e.g., derived during training phases in which data is collected for one or more vehicle trips where the vehicle is driven by an associated driver) and current driver matrices (e.g., derived during an identification phase for a current driver). A driver identifier module 118 may be configured to compare individual matrices of the current driver profile to corresponding matrices of driver profiles for drivers 1 through N in order to determine likelihoods that a current driver is each of drivers 1 through N. Example driver identification methods are described below with respect to FIGS. 4 and 5.

A user interface module 120 may be configured to control presentation of information regarding the driver identification via a display 122 or other output device (e.g., vehicle speaker, connected mobile device, etc.) that is integrated with the in-vehicle computing system 108 and/or remote from and coupled to the in-vehicle computing system 108. The user interface module 120 may generate and control presentation of a graphical representation of one or more of the driver profile matrices 116 and/or an indication of the likelihood that a current driver matches a driver associated with one or more of the driver profile matrices.

The user interface module 120 may also be configured to receive and process input from one or more user input devices 124 (e.g., a touch screen, actuatable elements such as buttons or dials, a microphone for capturing voice commands, one or more cameras for detecting gesture or other visual-based inputs, etc.), which may be integrated with the in-vehicle computing system 108 and/or remote from and coupled to the in-vehicle computing system 108. The user input may be used by the user interface module 120 to control interaction with the presented information. For example, user input may be provided to the user interface module 120 to scroll through graphical representations of different driver profile matrices.

Figure 2:
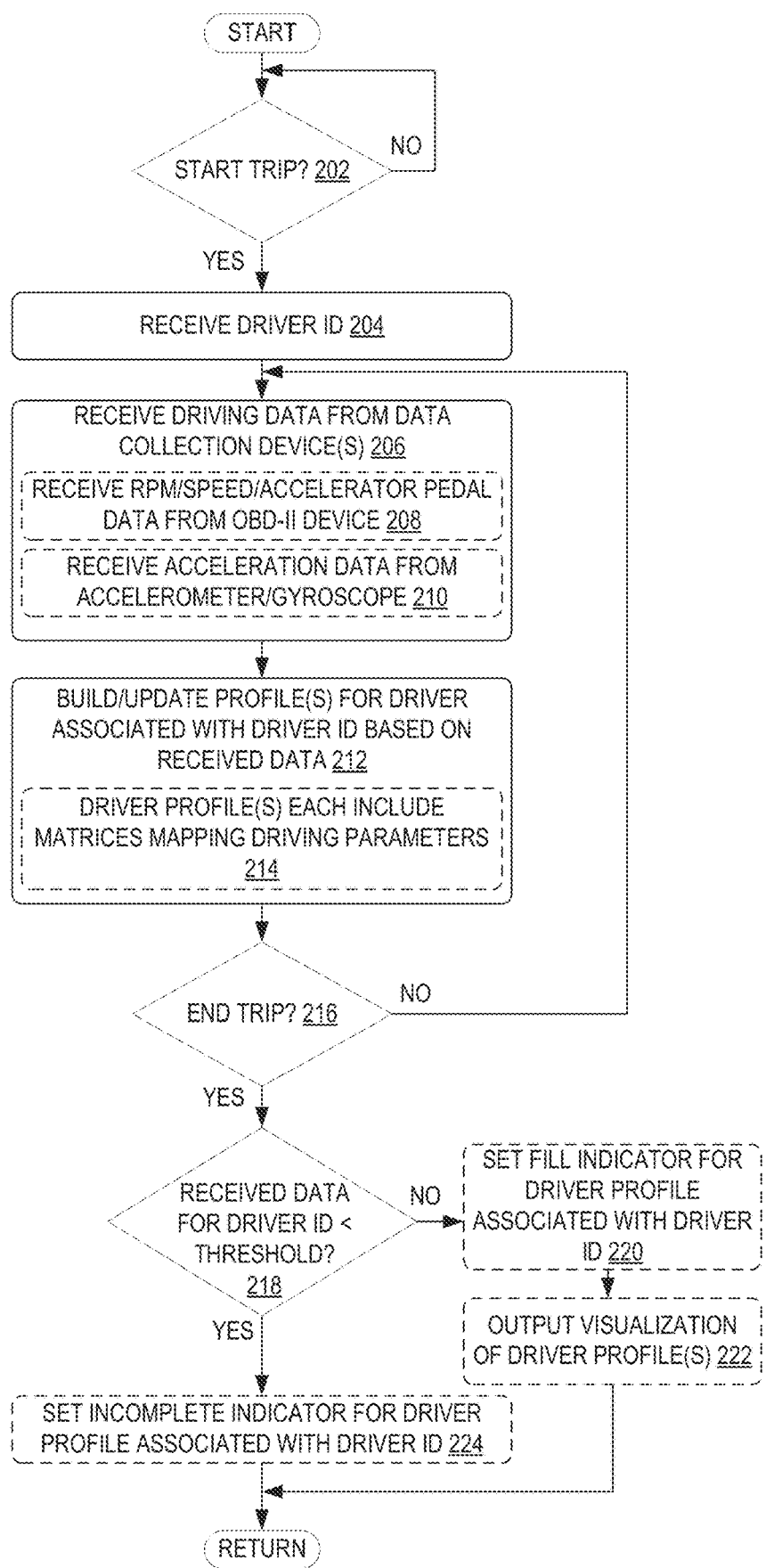
FIG. 2 shows a flow chart of an example method for operating a driver identification system in a training phase in accordance with one or more embodiments of the present disclosure.

FIG. 2 shows a flow chart of an example method 200 for operating a driver identification system (e.g., driver identification system 100 of FIG. 1) in a training phase. For example, method 200 may be performed by executing stored instructions with a processor using observed data collected by one or more sensors, as described above with respect to the components of FIG. 1. At 202, the method includes determining if a vehicle trip has been started. Determining if a vehicle trip has been started may include detecting a vehicle on/ignition on event (e.g., a startup of the vehicle and/or a vehicle system such as an in-vehicle computing system and/or one or more components of the driving identification system), detecting that the vehicle has been started for a threshold period of time, detecting that the vehicle has moved or engaged a gear other than park (e.g., shifted from a parking gear to another driving gear) after an ignition on event, and/or another automatic detection. The start of the vehicle trip may additionally or alternatively be determined by detecting input requesting a start of the vehicle trip (e.g., user input to the in-vehicle computing system requesting a start of a training phase).

The start trip determination at 202 may include determining whether a vehicle trip corresponding to a training phase (as opposed to a vehicle trip corresponding to a non-training phase, such as a vehicle trip corresponding to a driver identification phase) has been started. The determination that a vehicle trip corresponds to a training phase may be determined based on user input (e.g., requesting a training phase to be started or providing information, such as a driver ID, indicating that a vehicle trip is to be attributed to a training phase). In other examples, a vehicle trip may be determined to correspond to a training phase automatically unless conflicting input is received or determined (e.g., a request to not attribute the vehicle trip to a training phase, a request to attribute the vehicle trip to another phase, such as an identification phase, a lack of information used for the training phase such as a lack of receipt of a driver ID, etc.).

If a vehicle trip is not started (e.g., "NO" at 202), the method returns to continue monitoring for a start of a vehicle trip. If a vehicle trip is started (e.g., "YES" at 202), the method includes receiving a driver ID, as indicated at 204. For example, a driver of a vehicle may directly input a driver ID or an in-vehicle computing system may automatically acquire a driver ID (e.g., upon detecting entry of a driver or start of a vehicle trip) using any suitable input mechanism, such as a touch screen, biometric scanner, camera, microphone, etc., and the in-vehicle computing system may receive the driver ID from that user input mechanism. The driver ID may be a unique identifier, such as a string of one or more characters (e.g., alphabetic, numeric, alphanumeric, symbolic, and/or any combination thereof), one or more gestures, and/or one or more biometric markers (e.g., a fingerprint, facial features, eye features, etc.). The driver ID may uniquely distinguish the driver from all other drivers of an associated vehicle and/or may uniquely distinguish the driver from all other drivers of a centralized database for multiple vehicles (e.g., including the associated vehicle).

At 206, the method includes receiving driving data from one or more data collection devices (e.g., one or more data collection devices 102 of FIG. 1). As indicated at 208, the received driving data may include engine speed (e.g., RPM), vehicle speed, and/or accelerator pedal position data from an OBD-II device (e.g., OBD-II device 104 of FIG. 1). As indicated at 210, the received driving data may additionally or alternatively include acceleration data from an accelerometer, gyroscope, or other inertial measurement unit (e.g., IMUs 106 of FIG. 1). The driving data may be sampled as described above with respect to the sampler module 112 of FIG. 1, with each sample including at least two values of a vehicle operating status with regard to at least two parameters (e.g., an indication of an acceleration of a vehicle in association with a speed of the vehicle, where the vehicle is observed as having the indicated acceleration while traveling at the indicated speed).

At 212, the method includes building and/or updating one or more profiles for a driver associated with the driver ID (received at 204) based on the data received at 206. As indicated at 214, the driver profiles each include matrices mapping driving parameters. For example, a driver ID may be associated with a plurality of matrices (e.g., the driver profile matrices 116 including driver 1 matrices, driver N matrices, etc., of FIG. 1) modelling pairs of driving parameters (e.g., acceleration at different speeds, engaged gear at different speeds, etc.). As discussed above with respect to the driver profile matrices 116 of FIG. 1, each matrix of the plurality of matrices for the driver ID may include a counter for each pair of parameters modelled by that matrix. The counter for a given pair of parameters is incremented for each instance that the received driving data indicates that the vehicle is operated according to the given pair of parameters. For example, a cell that is positioned in a row associated with a speed of 1 km/h and in a column associated with an acceleration of 0.1 m/s$^2$ may be incremented for each sample of driving data that indicates that the vehicle is accelerating at 0.1 m/s$^2$ while the vehicle is travelling at a speed of 1 km/h. If a sample of driving data includes values for a pair of parameters that are not already modelled by an existing matrix for the associated driver (e.g., associated with the driver ID received at 204), a new matrix may be generated/built for the pair of parameters. The matrices may have predefined formats (e.g., ranges of values for each parameter, number of values for each parameter, interval/spacing between values of each parameter mapped in the matrix, etc.). In other examples, the matrices may be dynamically configured and/or reconfigured based on received driving data (e.g., to fit the received driving data). For example, once a predetermined amount of driving data for a pair of parameters has been measured and received, a matrix may be generated for that pair of parameters, including ranges of values for each parameter that at least include the measured values and a buffer around the measured values. The buffer may be a first amount lower than the lowest measured value and a second amount higher than the highest measured value, where the first amount could be equal to or different from the second amount, and where each of the first and second amount may be predetermined or based on the measured values, such as a non-zero percentage of the highest and lowest measured values, respectively.

Each driver profile for each driver may have multiple matrices. Examples of these matrices are referred to below as Ax, AccX, AccX2, AccY, RPM, Accelerator, Ax1, Ax2, Gear, Ay, Ay1, Accel'Accel, and Accel'Accel(F). The Ax matrix may be built using the parameters of instant acceleration and speed. The acceleration may be calculated from OBD data (e.g., using speed and time) and the speed may be received or calculated from OBD data. The Ax matrix for a given driver may characterize typical acceleration and deceleration rates at various speed regions for the given driver.

The AccX matrix may be built from the parameters of acceleration (forward and reverse acceleration) as collected from an accelerometer and/or gyroscope and speed as collected from OBD data. The AccX2 matrix may also be built from the parameters of acceleration (e.g., collected from an accelerometer and/or gyroscope) and speed (collected from OBD data). However, the AccX2 matrix may only count values of acceleration that are greater than a threshold, such as 0.5 m/s$^2$, and may filter out other accelerations so that the other accelerations are not represented by the matrix. The AccY matrix may be similar to the AccX matrix, and may map lateral accelerations (e.g., in a perpendicular direction to the forward/reverse accelerations used in the AccX matrix) to speed. The lateral acceleration data for the AccY matrix may be collected by the accelerometer and/or gyroscope, while the speed data for the AccY matrix may be collected from OBD data. The AccY matrix may characterize turn intensity at various speed regions.

The RPM matrix may be built from RPM and vehicle speed parameters using RPM and speed data collected from the OBD data. The Accelerator matrix may be built using accelerator pedal position data and vehicle speed data (each collected from OBD data) as parameters. The Ax1 matrix may use the same parameters as the Ax matrix (e.g., instantaneous acceleration and speed each collected and/or calculated from OBD data), and may only count instance of acceleration when the speed has changed from an immediately prior sample. For example, if at a first sample time, a vehicle is travelling at 5 km/h and an instantaneous acceleration is 0 m/s$^2$, and at a second sample time, the vehicle is still travelling at 5 km/h, the cell of the Ax1 matrix associated with the 5 km/h and 0 m/s$^2$ values will only be incremented for the first sample time and will not be incremented at the second sample time. The cell of an Ax matrix associated with the 5 km/h and 0 m/s$^2$ values will instead be incremented for both the first and second sample times. It is to be understood that the Ax1 matrix or another matrix may provide the same approach (only incrementing a counter when a speed has changed from an immediately prior sample) using acceleration information collected from an accelerometer.

The Ax2 matrix may use the same parameters as the Ax matrix (e.g., instantaneous acceleration and speed each collected and/or calculated from OBD data), and may only count an average value of acceleration for each accelerating or decelerating interval. For example, an accelerating interval may be defined as a period of positive acceleration starting from a 0 m/s$^2$ acceleration and ending at a 0 m/s$^2$ acceleration (with no decelerations/negative accelerations therebetween). A decelerating interval may be defined as a period of negative acceleration starting from a 0 m/s$^2$ acceleration and ending at a 0 m/s$^2$ acceleration (with no positive accelerations therebetween). In each case, the acceleration value tracked in the Ax2 matrix may correspond to an average of the non-zero acceleration values (positive or negative, depending on whether the interval is an accelerating or decelerating interval) measured between the starting and ending 0 m/s accelerations.

The Gear matrix may be built using engine RPM divided by vehicle speed to calculate a current gear as one parameter and vehicle speed as another parameter. The RPM and speed may be collected using OBD data. Gear identification may be performed using the monitored RPM and speed information, as well as stored/predetermined data such as tire diameter, axle gear ratio, and transmission ratio-to-gear mappings for the vehicle. In some examples, a controller of the vehicle may determine the gear using the above-described data and provide the information to the OBD-II device and/or directly to the in-vehicle computing system for use in building the Gear matrix during a vehicle trip. In other examples, the in-vehicle computing system may receive an indication of a current gear at one or more sample times directly from an engine controller via a CAN bus or other vehicle data source.

The Ay matrix may be built using lateral (e.g., side) acceleration as one parameter and speed as another parameter. The lateral acceleration may be calculated from data collected by an accelerometer and/or gyroscope, and speed may be collected from OBD data. The Ay1 matrix may be built using the same parameters as the Ay matrix, and may not include low lateral accelerations (e.g., lateral accelerations below a threshold value) and may filter out other lateral accelerations so that the other lateral accelerations are not represented by the matrix. In some examples, the threshold for the Ay1 matrix may be the same as the threshold for the AccX2 matrix (e.g., 0.5 m/s$^2$). In other examples, the threshold for the Ay1 matrix may be different from (e.g., lower than or higher than) the threshold for the AccX2 matrix.

The Accel'Accel matrix may be built using accelerator pedal position as one parameter and a first derivative of the accelerator pedal position as another parameter, each of which may be collected by and/or calculated from OBD data. The Accel'Accel matrix may describe a preferred accelerator position and associated use intensity for a corresponding driver. The Accel'Accel(F) matrix may be built using the same parameters as the Accel'Accel matrix, where the first derivative is relaxed by a one second window. For example the first derivative of the accelerator pedal position may be taken over a one second window in order to smooth the data. The first derivative may be relaxed by a one second window to better find an accelerator pedal position where the derivative is close to zero for a one second interval, in which the accelerator pedal position is not significantly changed for one second.

The above matrices are examples of matrices that may be included in any given driver profile. In some examples, each driver profile for each driver associated with a vehicle may include the same number and/or types of matrices (e.g., all of the matrices described above). In other examples, driver profiles may have different matrices, depending on a type of driver or an availability of data. It is to be understood that some of the modifications of profiles described above (e.g., using averages of a parameter, using only values of a parameter above a threshold, etc.) may be applied to other matrices to derive additional matrices. For example, a modified Gear matrix may be included in one or more driver profiles, which is built using gear versus speed data, and which may only include data for gears below a threshold gear. In such examples, a plurality of matrices of a profile may use data relating to the same parameters or types of parameters; however, different subsets of the data for a given parameter may be used in different matrices of the plurality of matrices.

Returning to method 200, at 216, the method includes determining if a vehicle trip has ended. The vehicle trip may be determined to have ended responsive to detection of a vehicle shut off/ignition off, a shift to a parking gear (e.g., from another driving gear), a user input ending the vehicle trip, and/or any other suitable trigger. In some examples, the vehicle trip may be determined to have ended when a threshold amount of driving data has been received (e.g., a threshold number of counts for one or more of the matrices of the driver profiles has been registered). If the trip has not ended (e.g., "NO" at 216), the method returns to 206 to continue receiving driving data from one or more data collection devices. In this way, the method may continuously monitor driving behaviors and update driver profiles in real-time or near real-time (e.g., updates may be performed for each sample of driving data or once a threshold number of samples of driving data). If the trip is determined to have ended (e.g., "YES" at 216), the method includes determining if the received data for the driver ID (e.g., the driver ID received at 204, and the driving data received for that driver ID over all completed training phase trips) is less than a threshold, as indicated at 218. The threshold at 218 may be a single threshold for the driver profile, or a plurality of thresholds, each associated with a different matrix of the driver profile (such that the trip is determined to be ended if at least one of the thresholds is met, or, in alternative examples, only if all of the thresholds are met). The threshold may include a threshold amount of values in each matrix (e.g., a total number of counts in each cell of the matrices) and/or a threshold amount of samples of data that has been received.

If the received data for the driver ID is not less than the threshold (e.g., is greater than or equal to the threshold, "NO" at 218), the method optionally includes setting a fill indicator for the driver profile associated with the driver ID at 220. The indicator may be used to indicate that the driver profile associated with the driver ID has enough data to be used in a comparison for identifying an unidentified driver in a later vehicle trip. The method may also optionally include outputting a visualization of the driver profile (e.g., one or more matrices of the driver profile), as indicated at 222.

Figure 3:
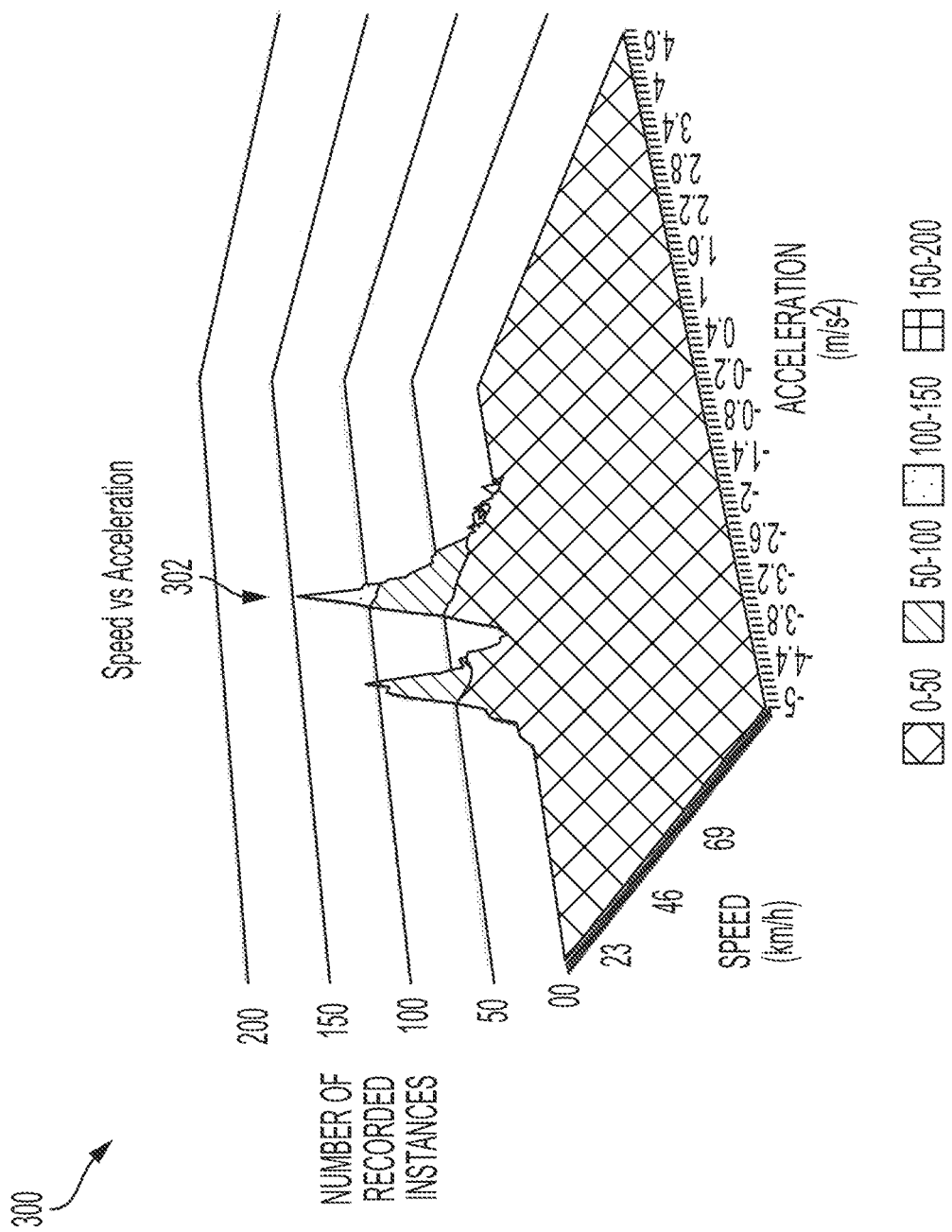
FIG. 3 shows an example visualization of an example driver profile matrix in accordance with one or more embodiments of the present disclosure.

An example graphical visualization 300 of a speed vs. acceleration matrix of a driver profile is shown in FIG. 3. The graphical visualization 300 shows a number of instances (e.g., a number of samples that caused an associated counter to be increased) during one or more vehicle trips in which each associated pair of speed and acceleration values was observed. In the illustrated example, common speed/acceleration values for the associated driver fell into two regions. The most common speed/acceleration pairing in the example of FIG. 3, represented by peak 302, occurs at a substantially low speed and moderate acceleration (e.g., positive acceleration from a stopped state). Visualizations of driver profiles, such as the visualization shown in FIG. 3, may be stored on a backend server and/or as part of a web application to be used (e.g., viewed on a suitable display) by an administrator or vehicle/vehicle fleet owner to monitor use of the car.

Returning to FIG. 2, if the received data for the driver ID is less than the threshold (e.g., "YES" at 218), the method may optionally set an incomplete indicator for the driver profile associated with the driver ID, as indicated at 224, and then return to wait for a next vehicle trip. In some examples, an indication of a level of completion of the driver profile and/or one or more matrices of the driver profile may be presented to a user. An indication of an amount of driving data that would complete the driver profile (e.g., bring the received data for the driver profile above the threshold), which may be represented by a driving distance, may be presented to a user to assist the user in completing a training phase for the driver profile.

Figure 4:
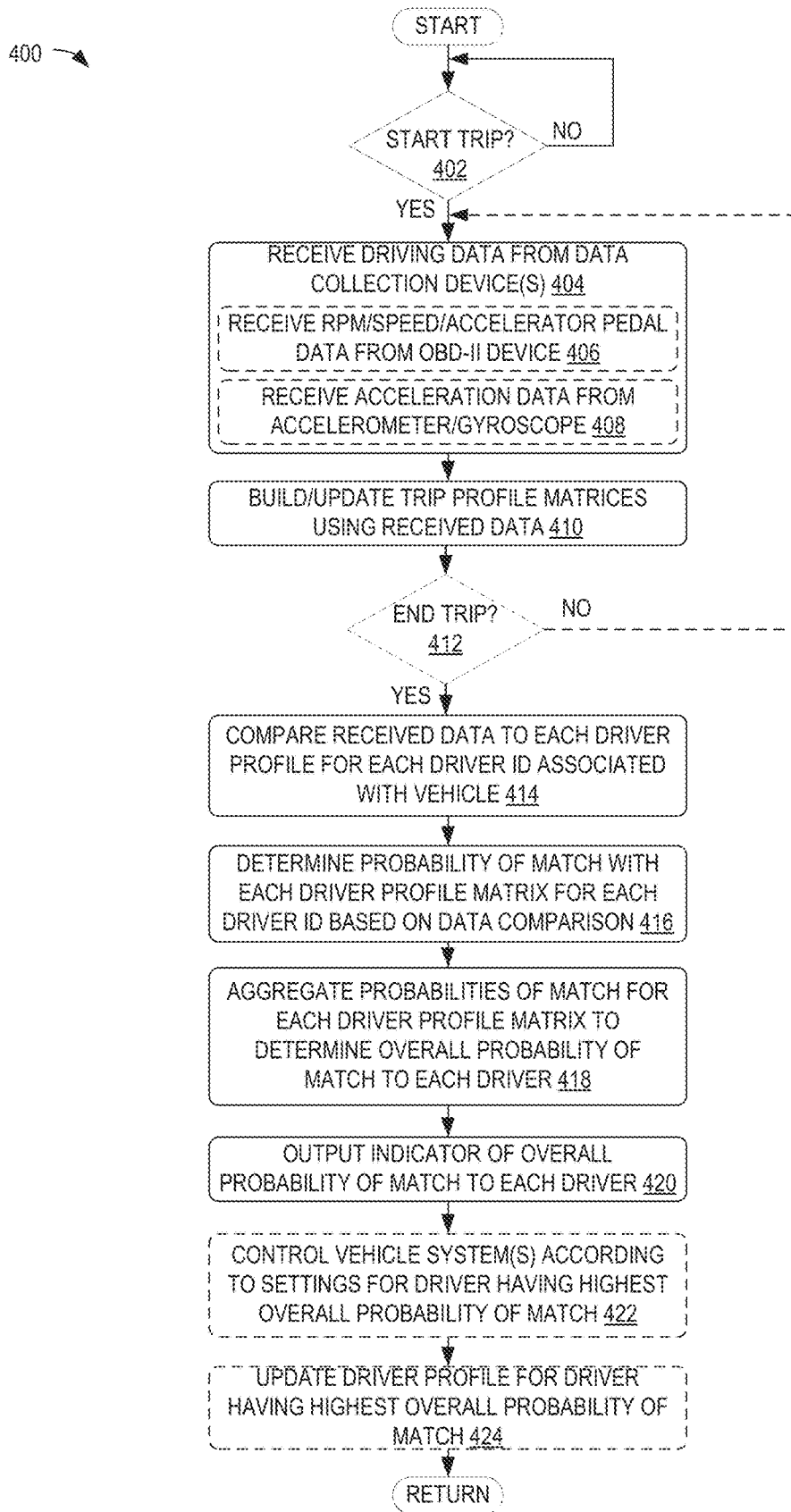
FIG. 4 shows a flow chart of an example method for operating a driver identification system in an identification phase in accordance with one or more embodiments of the present disclosure.

Turning now to FIG. 4, an example method 400 for operating a driver identification system (e.g., driver identification system 100 of FIG. 1) in a driver identification phase to infer an identity of a driver (e.g., via an automatic identification of the driver from among a limited number of drivers) is illustrated. For example, method 400 may be performed by executing stored instructions with a processor using observed data collected by one or more sensors, as described above with respect to the components of FIG. 1. The driver identification performed via method 400 may identify a driver using observed driving behaviors that are monitored during and throughout a vehicle trip, without using a direct driver identification mechanism (e.g., without using cameras/imaging sensors, without using biometric scanners, without using direct user input of a driver identifier). The driver identification of method 400 (which may include processes also described with respect to method 500 of FIG. 5 below) may include performing an automatic identification of a driver of a vehicle from among a limited number of (e.g., known) drivers. The automatic identification may be based upon a probability correlation of at least two driving parameters sampled repeatedly over time during a current vehicle trip to stored data associated with the limited number of drivers based on one or more previous drives (e.g., one or more previous vehicle trips of the vehicle and/or one or more previous vehicle trips of another vehicle(s) that is driven by one or more of the limited number of drivers). For example, the stored data may include data stored in response to performance of method 200 of FIG. 2. In some examples, a vehicle parameter may be adjusted responsive to the automatic identification.

At 402, the method includes determining if a vehicle trip for a vehicle is started. The determination of the start of the trip may include detecting the conditions discussed above with respect to the determination at 202 of FIG. 2. The determination at 402 may utilize the above-described mechanisms (e.g., detecting a start of the vehicle, user input indicating a start of a trip, etc.) to determine whether the vehicle trip is to be used as an identification phase of a driver identification method. For example, if the trip is started and no indication of a driver ID is provided to the driver identification system, the trip may be attributed to an identification phase. If a trip is not determined to be started (e.g., "NO" at 402, which may include the determination that a trip that is not attributed to an identification phase, such as a trip that is attributed to a training phase or a trip for which the user has provided input to decline driver identification), the method returns to continue monitoring for a start of a vehicle trip for a driver identification phase.

If a trip is determined to be started (e.g., "YES" at 402), the method includes receiving driving data from one or more data collection devices, as indicated at 404. The data may include RPM, vehicle speed, and accelerator pedal data from an OBD-II device, as indicated at 406, and/or acceleration data from an accelerometer and/or gyroscope, as indicated at 408. At 410, the method includes building/updating one or more trip profile matrices using the received data (e.g., the data received at 404). The receipt of data and matrix building elements of method 400 of FIG. 4 may be similar to associated elements of method 200 of FIG. 2. Accordingly, it is to be understood that the above description of elements 206-214 of method 200 of FIG. 2 also applies to elements 404-410 of method 400 of FIG. 4. In the case of method 400, the trip profile matrices built at 410 may be attributed to an anonymous current driver profile rather than a profile associated with a particular known driver ID.

At 412, the method optionally includes determining if the vehicle trip started at 402 is ended. The determination of whether the vehicle trip has ended is optional, as the method may instead continuously compare received data (or compare threshold amounts of received data at a time) to generate real-time reports of a driver identification, the results of which may become more accurate as more data is received. If the determination at 412 is performed, the method may return to 404 to continue receiving driving data if the trip is not ended (e.g., "NO" at 412).

If the determination at 412 is not performed, or if the determination at 412 is performed and the trip is determined to be ended (e.g., "YES" at 412), the method includes comparing received data (e.g., the driving data received at 404, as included in the profile matrices at 410) to each driver profile for each driver ID associated with the vehicle, as indicated at 414. In one example, the comparison of a selected pair of associated profile matrices may include determining differences between corresponding cells of a profile matrix for a current driver and an associated profile matrix for a known driver and averaging or otherwise aggregating the differences. Additional or alternative examples of comparisons are described below with respect to FIG. 5. At 416, the method includes determining a probability of a match with each driver profile matrix for each driver ID based on the data comparison performed at 414. At 418, the method includes aggregating the determined probabilities of match for each driver profile matrix (e.g., for a given driver ID) to determine an overall probability of match to each driver associated with the driver IDs associated with the vehicle.

Figure 5:
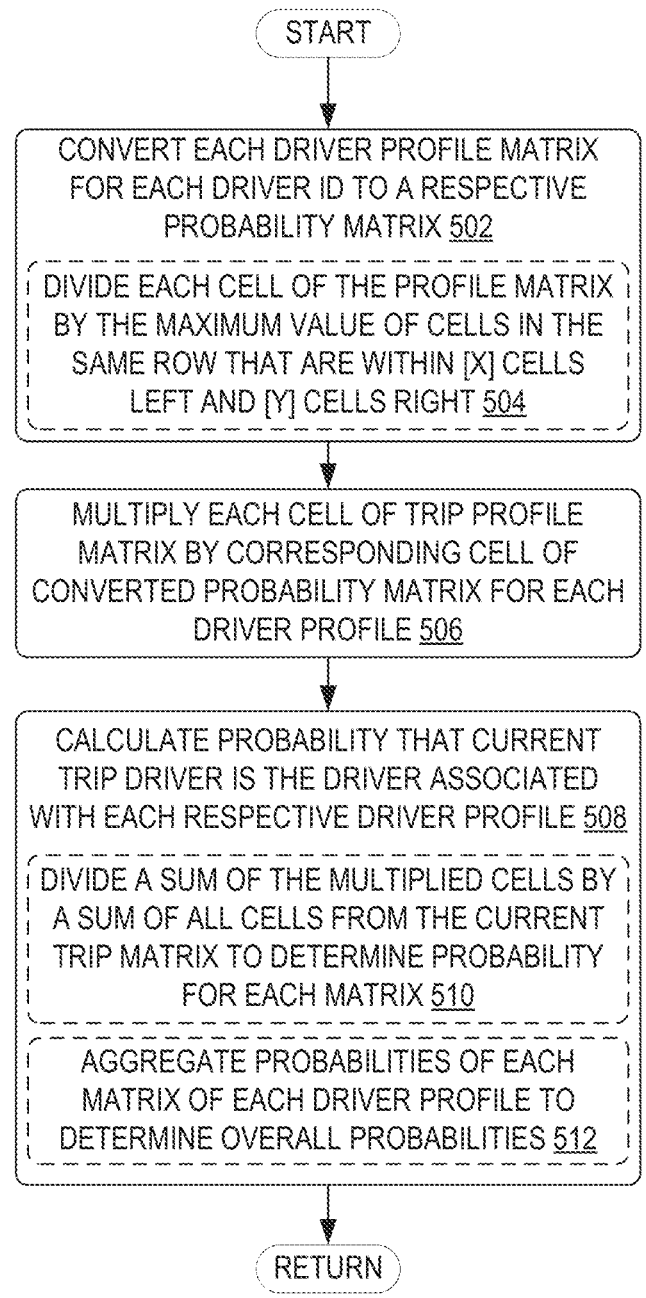
FIG. 5 shows a flow chart of an example method of determining a probability calculation for identifying a current driver in accordance with one or more embodiments of the present disclosure.

Turning briefly to FIG. 5, an example method 500 is shown for performing the probability determination described above at 414-418. At 502, the method includes converting each driver profile matrix for each driver ID to a respective probability matrix. The probability matrix may be calculated because the amount of data collected during the training phase and the amount of data collected during the identification phase may be different. For example, the amount of data collected during the training phase may be greater than the amount of data collected during an identification phase for an unknown driver, thus a given known driver profile matrix may be larger than a given unknown (e.g., current) driver profile matrix. The probability matrix may be calculated to normalize and smooth the collected data. In addition, the probability matrix may enable a comparison of a particular portion of the matrices, such as where an unknown driver profile matrix has data distribution close to an associated known driver profile matrix.

As indicated at 504, the conversion may include, for each driver profile matrix associated with a driver ID, dividing each cell of the profile matrix by the maximum value of cells in the same row that are within [X] cells left and [Y] cells right, where X and Y are non-zero integers. The values of X and Y may be the same or different, and may be based on features of the respective matrix (e.g., number of rows, columns, and/or cells of the matrix, spacing between cell values for the matrix, etc.). In one example, X and Y may both be equal to 10. In this example, a function for determining a value of a given cell of a probability matrix (P) may be represented by:

$$P_{i,j} = \frac{C_{ij}}{\max(C_{i,j-10}, \ldots, C_{i,j+10})},$$

where i represents a row of the associated cell, j represents a column of the associated cell, and C represents a matrix, in this example, the selected stored driver profile matrix (e.g., a stored driver profile matrix for a selected known driver that maps the same two parameters as the probability matrix). The above calculation may be performed to compare each matrix of a current trip profile to the associated P of a stored driver profile for each known driver. In some examples, rough calculations of probability for each driver may be used to reduce or eliminate more complex processing (e.g., the calculation of one or more of the functions described herein) for matrices of driver profiles that are determined to have a probability below a threshold (e.g., 10%) according to the rough calculations.

In order to compare a current trip profile matrix with a corresponding matrix (e.g., a matrix associated with the same parameters) collected on a training phase for a given driver ID, each cell of the current trip matrix may be multiplied by the same (corresponding) cell from the probability matrix ($C_{i,j}*P_{i,j}$) for each known driver profile, as indicated at 506. To calculate the probability that current trip driver is the same driver of the profile matrix at 508, the method may include dividing a sum of the multiplied cells ($\Sigma C_{i,j}*P_{i,j}$) by a sum of all cells from the current trip matrix ($\Sigma C_{i,j}$), as indicated at 510. The following function may be used to determine the probability that the driver of the current trip is the same as the driver of a prior-record trip based on a matrix P associated with the known driver of the prior record trip and a matrix C associated with the driver of the current trip, where P and C in this function are matrices having the same parameters (e.g., speed vs. acceleration, speed vs. gear, etc.):

$$\text{probability} = \frac{\sum C_{i,j}*P_{i,j}}{\sum C_{ij}}$$

As indicated at 512, the probabilities calculated for each matrix of a given driver profile may be aggregated to determine an overall/aggregated probability for the given driver profile, which indicates a probability that a current trip driver is the driver associated with the given driver profile. The aggregation may be performed by averaging a probability for each matrix of a given driver profile in some examples. In such examples, the averaging may be weighted, such that one or more matrices have a greater influence (e.g., are weighted more heavily) than other matrices in the average calculation. The weighting may be predetermined or may be dynamically determined based on measured data for a group of drivers associated with a subject vehicle. For example, if one or more matrices of the stored driver profiles for the subject vehicle are determined to have the greatest amount of deviation relative to one another (e.g., if it is easier to recognize a driver using the one or more matrices), the aggregation may include weighting the one or more matrices higher than other matrices of the driver profiles. In some examples, the weighting may be adjusted based on operating conditions (e.g., environmental conditions of the vehicle, current traffic conditions, road conditions, trip length, etc.) and/or based on user input specifying a weight for one or more matrices.

The current trip driver may be determined to be the driver associated with the driver profile that has the highest aggregated probability. In some examples, the current trip driver may be determined to be the driver associated with the driver profile that has the highest aggregated probability only if the highest aggregated probability is over a threshold (e.g., 50%). If the highest aggregated probability is under the threshold, the system may present an indication of the highest aggregated probability and a notice that more driving data is requested to increase accuracy of the identification.

Figures 6A, 6B:
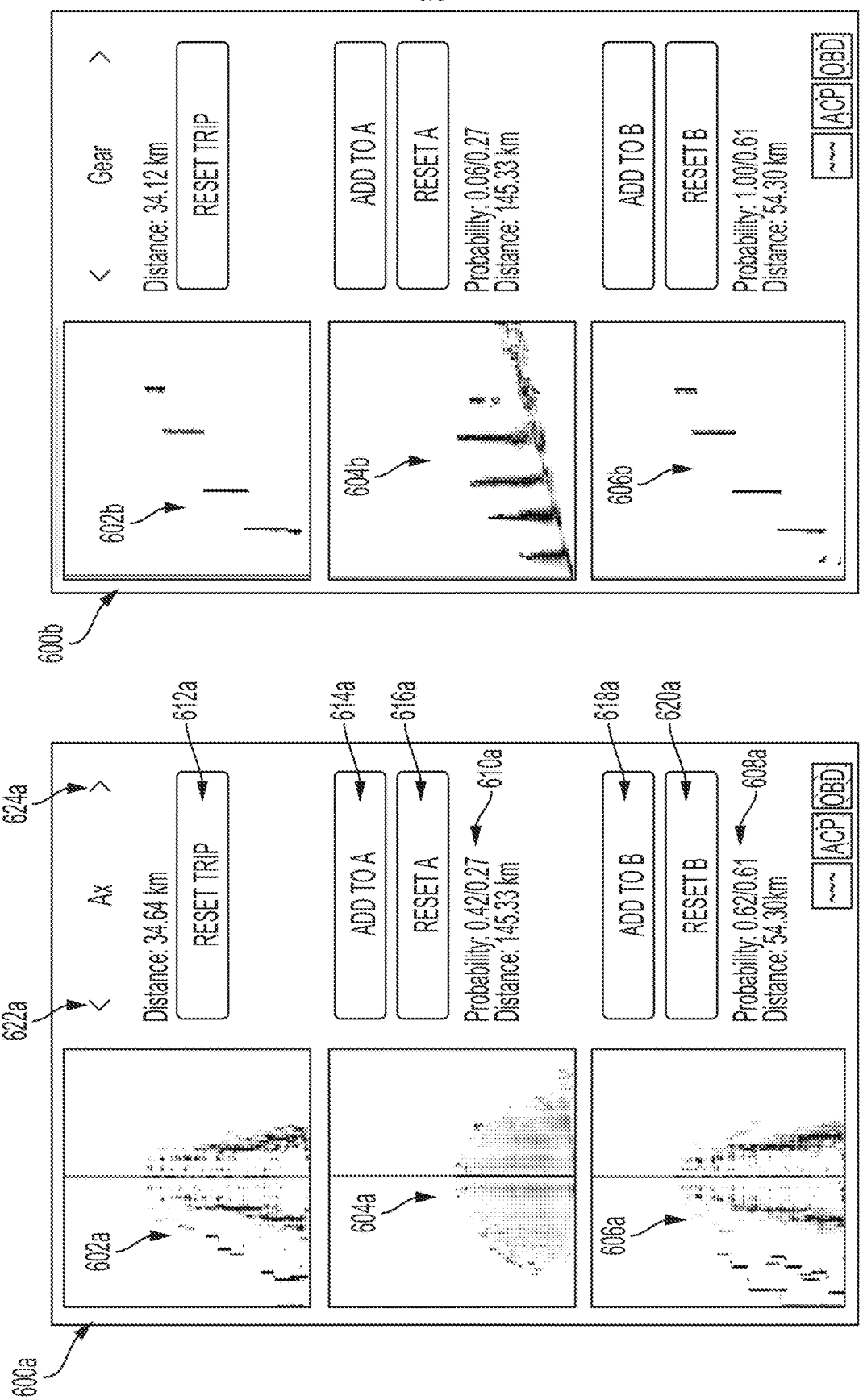
FIGS. 6A and 6B show example screens of a user interface for a driver identification system in accordance with one or more embodiments of the present disclosure.

Returning to FIG. 4, method 400 includes outputting an indicator of an overall or aggregate probability of a match to each driver, as indicated at 420. Outputting the indicator may be one example of adjusting a vehicle parameter responsive to the automatic identification of the driver (e.g., the identification performed via method 400). Examples of such output are provided in FIGS. 6A, 6B, and 7. FIG. 6A shows an example user interface 600a for a first driver profile matrix (e.g., an Ax matrix, plotting speed vs instant acceleration), which may be displayed via an in-vehicle display (e.g., display 122 of FIG. 1) and/or a display communicatively connected to the vehicle (e.g., a display of a mobile device). The user interface 600a shows a graphical representation of the associated driver profile matrix (e.g., the Ax matrix) for a current driver at 602a, a graphical representation of the associated driver profile matrix for a first stored driver (e.g., driver A) at 604a, and a graphical representation of the associated driver profile matrix for a second stored driver (e.g., driver B) at 606*a*. As shown, the current driver profile matrix most closely matches the profile matrix for driver B, which is reflected in the associated probability indicator for that driver, shown at 608*a*, versus the probability indicator for driver A, shown at 610*a*. The probability indicator for each stored driver may show a probability associated with the currently-shown matrix (e.g., 0.62 or 62% for driver B and 0.42 or 42% for driver A) and an overall or aggregate probability associated with the driver based on all matrices (e.g., 0.61 or 61% for driver B and 0.27 or 27% for driver A). The user interface may also indicate a driving distance over which driving data has been collected for each driver (e.g., the current driver, driver A, and driver B).

Actuatable user interface elements may be present in the user interface 600*a*, such as interactive buttons for resetting a current trip, shown at 612*a*, adding data from a current trip to an associated profile for driver A, shown at 614*a*, resetting (e.g., deleting acquired driving data/deleting a matrix) a driver A profile, shown at 616*a*, adding data from a current trip to an associated profile for driver B, shown at 618*a*, and resetting a driver B profile, shown at 620*a*. The actuatable elements of user interface 600*a* may be selected by user input to a touch screen, user input that scrolls through selectable elements, and/or other suitable user input (e.g., using one or more of the user input mechanisms described above with respect to user input device 124 of FIG. 1).

The user interface may also include navigation elements, such as navigation indicators 622*a* and 624*a*, which may be used to cycle through different user interface screens. For example, by selecting one of indicators 622*a* and 624*a*, a user may control the user interface to show a comparison/probability output for a different matrix. FIG. 6B shows an example user interface 600*b* that may be displayed responsive to selecting one of indicators 622*a* and 624*a*. For example, the user interface 600*b* is shown as a Gear matrix output, illustrating a graphical representation of a speed vs. gear matrix for a current driver at 602*b*, a graphical representation of a speed vs. gear matrix for driver A at 604*b*, and a graphical representation of a speed vs. gear matrix for driver B at 606*b*. The user interface 600*b* may include actuatable elements, distance indicators, and probability indicators, which are similar to those discussed with respect to the user interface 600*a* of FIG. 6A (e.g., elements 608*a*-624*a*). The interactive elements may be provided via an in-vehicle display and/or in-vehicle instrument panel or other user input device to allow a vehicle occupant to view the information from the driver identification system in some examples. In other examples, the vehicle occupants may only be provided with an indication of a driver identification determined to be a match to a current driver and/or a probability of the match. In such examples, other data generated by the driver identification system (e.g., as presented by the example user interfaces 600*a* and 600*b*) may be stored on a backend server and/or stored in association with an internet-based application to be used (e.g., viewed and interacted with) by an administrator and/or vehicle/vehicle fleet owner to monitor use of the vehicle (e.g., to determine which driver was identified at a given day/time).

Figure 7:
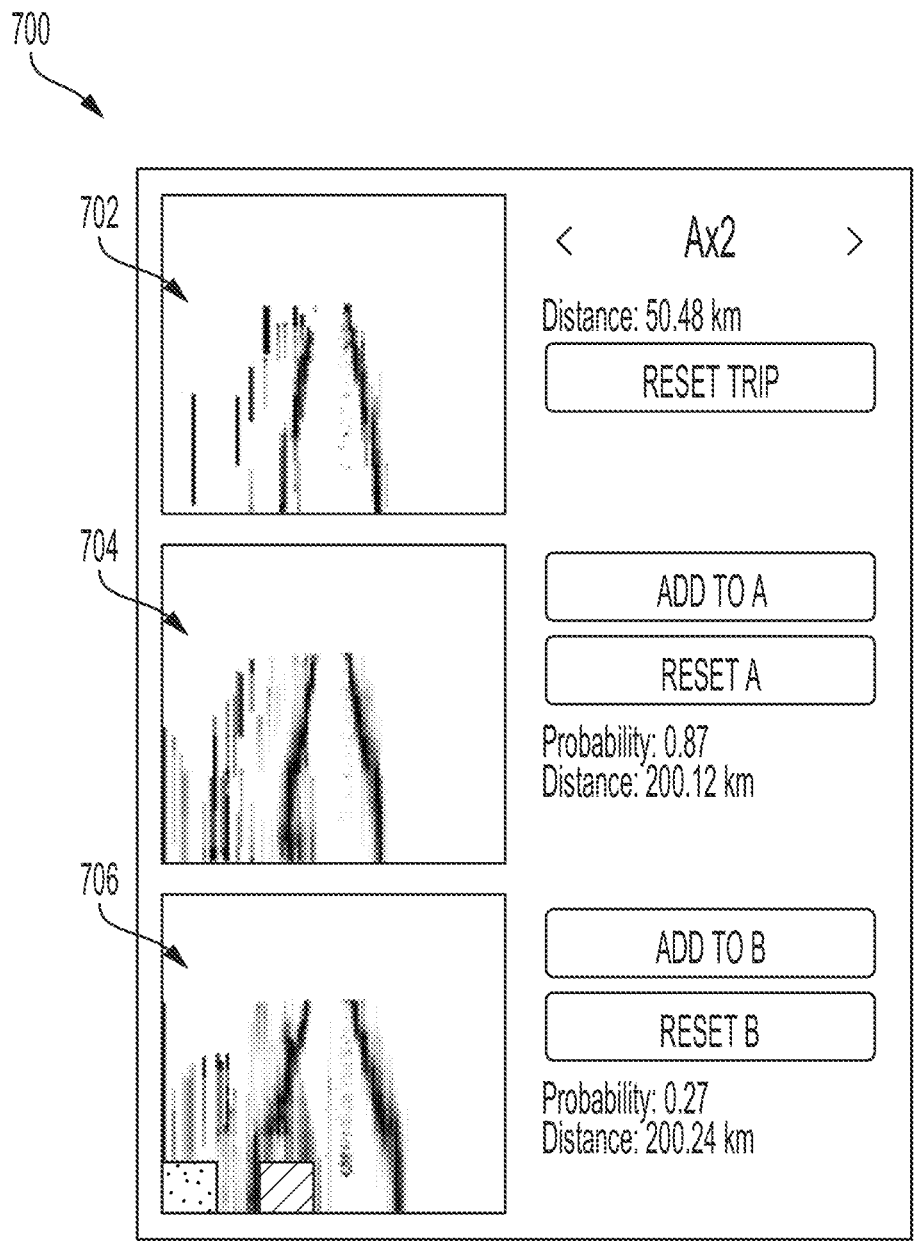
FIG. 7 shows an example user interface for a driver identification system in accordance with one or more embodiments of the present disclosure.

FIG. 7 shows an example of a user interface 700 for an Ax2 profile, which shows graphical representations of a speed vs. acceleration (using average acceleration values for each acceleration or deceleration interval) matrix for a current driver (702), a first stored driver A (704), and a second stored driver B (706). The user interface 700 may include actuatable elements, distance indicators, and probability indicators, which are similar to those discussed with respect to the user interface 600*a* of FIG. 6A (e.g., elements 608*a*-624*a*). In the example user interface 700, the probability indicator only shows one probability, which may be the probability that the current driver matches the driver associated with the respective Ax2 profile, using only the Ax2 profile data for the current and stored drivers. Although the user interfaces in FIGS. 6A, 6B, and 7 show only two drivers being compared to the current driver, it is to be understood that any number of stored drivers may be shown (e.g., viewable on a single viewable screen of the user interface, or viewable by performing a scrolling or screen shifting input to view additional driver profile matrix representations).

Returning to FIG. 4, method 400 optionally includes controlling one or more vehicle systems according to settings for a driver having a highest overall or aggregate probability of matching the current driver, as indicated at 422. Controlling the one or more vehicle systems at 422 is another example of adjusting a vehicle parameter responsive to automatic identification of a driver of the vehicle. For example, user preferences for vehicle systems (e.g., climate controls, entertainment/radio system settings, vehicle performance settings, seat position settings, etc.) may be defined based on the probability determination to match an identified driver. The driver identification may be stored alongside of the driving data for the vehicle trip in order to provide a historical record of the trip (e.g., for fleet management or other purposes to identify who was driving the vehicle at a particular time/place, to identify whether an unexpected driver was driving the vehicle, etc.), a score for the driver (e.g., acceleration accuracy, brake use, turn accuracy, fuel efficiency, etc.), and/or other information. In some examples, the driver identification may be triggered responsive to detecting an accident in order to identify the responsible driver.

Method 400 may optionally include updating a driver profile for a driver having the highest overall or aggregate probability of matching the current driver, as indicated at 424. For example, the driving data for the current driver may be added to the matrices associated with the driver having the highest overall probability of matching the current driver (e.g., the driver identified as matching the current driver) in order to continuously update the driver matrices. In this way, the identification phase of the driver identification may also be used to train the driver identification system.

The above-described mechanisms for identifying a driver for a vehicle trip use driving behavior recorded during the vehicle trip, rather than direct user input or camera imaging mechanisms. Furthermore, the disclosed driver identification systems and methods may utilize only on-board diagnostic data and inertial measurement unit data to generate two-dimensional matrices that occupy very little storage space (e.g., magnitudes less storage space than even a single image file may use) and are efficient to process. The disclosed mechanisms may thereby have the technical effect of utilizing a reduced number/amount of sensors and computing resources relative to mechanisms that use direct user input and/or data from numerous on-board sensors. Furthermore, in transmitting data, such as an indication of an identified driver for a given trip, the data transmission may have a reduced size (thereby using less network bandwidth and being less susceptible to corruptive data loss) relative to systems that transmit raw data, such as raw imaging data for processing off-board a vehicle to directly identify a driver via image analysis.

Figure 8:
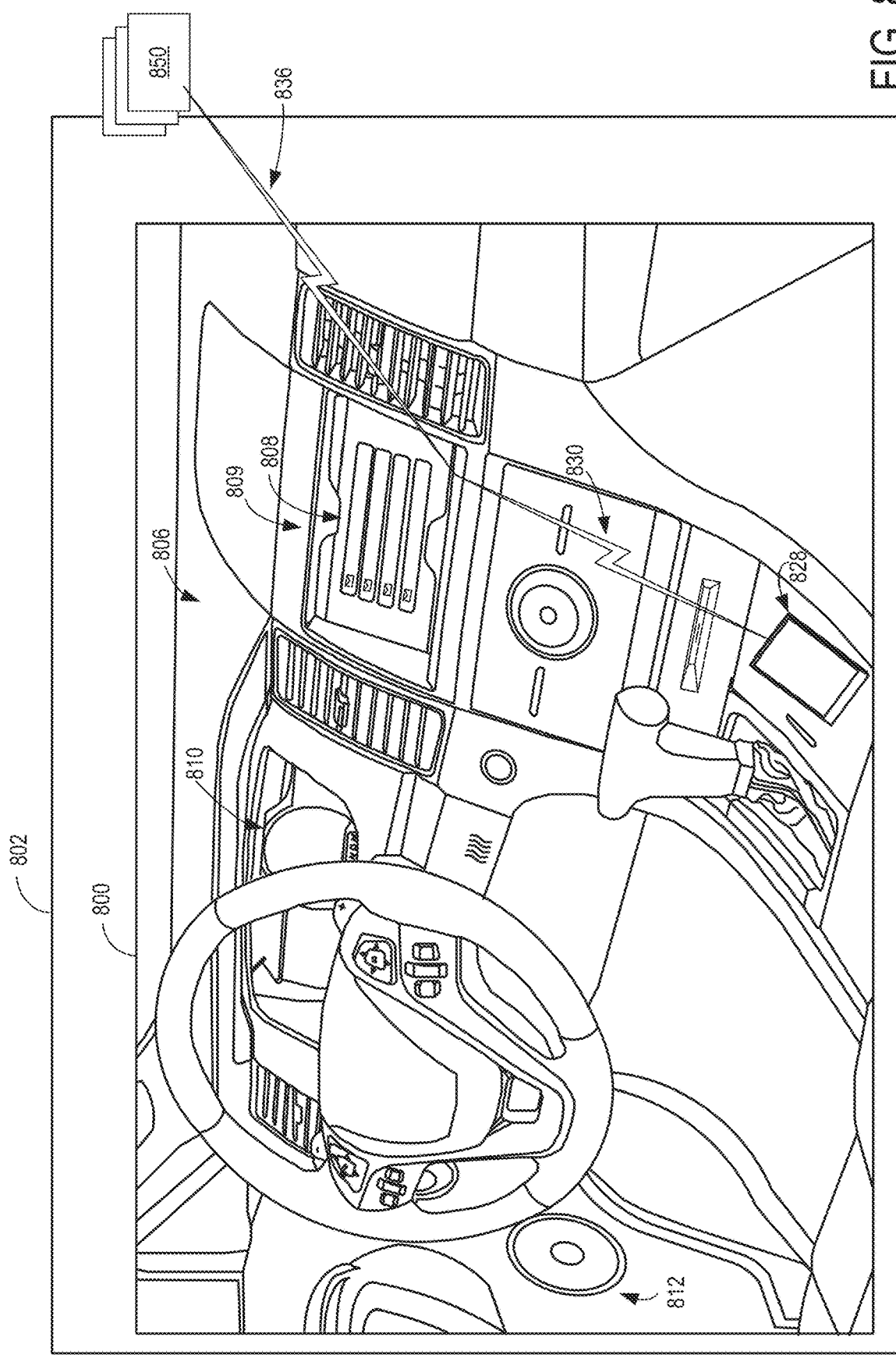
FIG. 8 shows an example partial view of a vehicle cabin in accordance with one or more embodiments of the present disclosure.

As described above, the disclosed methods may be performed, at least in part, within a vehicle using an in-vehicle computing system for driver identification. FIG. 8 shows an example partial view of one type of environment for a driver identification system: an interior of a cabin 800 of a vehicle 802, in which a driver and/or one or more passengers may be seated.

As shown, an instrument panel 806 may include various displays and controls accessible to a driver (also referred to as the user) of vehicle 802. For example, instrument panel 806 may include a touch screen 808 of an in-vehicle computing system 809 (e.g., an infotainment system), an audio system control panel, and an instrument cluster 810. While the example system shown in FIG. 8 includes audio system controls that may be performed via a user interface of in-vehicle computing system 809, such as touch screen 808 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 812 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output (e.g., to provide a directional alert, as described above). In further examples, in-vehicle computing system 809 may adjust a radio station selection, a playlist selection, a source of audio input (e.g., from radio or CD or MP3), etc., based on user input received directly via touch screen 808. One or more elements of the instrument panel may be used as the user input device(s) 124 of FIG. 1 or the display 122 of FIG. 1, and/or otherwise may be used to interact with the driver identification system described herein.

In some embodiments, one or more hardware elements of in-vehicle computing system 809, such as touch screen 808, a display screen, various control dials, knobs and buttons, memory, processor(s), and any interface elements (e.g., connectors or ports) may form an integrated head unit that is installed in instrument panel 806 of the vehicle. The head unit may be fixedly or removably attached in instrument panel 806. In additional or alternative embodiments, one or more hardware elements of the in-vehicle computing system may be modular and may be installed in multiple locations of the vehicle.

The cabin 800 may include one or more sensors for monitoring the vehicle, the user, and/or the environment. For example, the cabin 800 may include one or more microphones to receive user input in the form of voice commands and/or to measure ambient noise in the cabin 800 or outside of the vehicle. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 850 and/or mobile device 828. For example, the data collection devices 102 may include the above-described sensors and/or be in communication with one or more of the above-described sensors.

Cabin 800 may also include one or more user objects, such as mobile device 828, that are stored in the vehicle before, during, and/or after travelling. The mobile device 828 may include a smart phone, an on-board diagnostics device (e.g., an OBD-II dongle), a tablet, a laptop computer, a portable media player, and/or any suitable mobile computing device. The mobile device 828 may be connected to the in-vehicle computing system via communication link 830. The communication link 830 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct, Near-Field Communication [NFC], cellular connectivity, etc.) and configured to provide two-way communication between the mobile device and the in-vehicle computing system. The mobile device 828 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 830 may provide sensor and/or control signals from various vehicle systems (such as vehicle audio system, sensor subsystem, etc.) and the touch screen 808 to the mobile device 828 and may provide control and/or display signals from the mobile device 828 to the in-vehicle systems and the touch screen 808. The communication link 830 may also provide power to the mobile device 828 from an in-vehicle power source in order to charge an internal battery of the mobile device.

In-vehicle computing system 809 may also be communicatively coupled to additional devices operated and/or accessed by the user but located external to vehicle 802, such as one or more external devices 850. In the depicted embodiment, external devices are located outside of vehicle 802 though it will be appreciated that in alternate embodiments, external devices may be located inside cabin 800. The external devices may include a server computing system, personal computing system, portable electronic device, electronic wrist band, electronic head band, portable music player, electronic activity tracking device, pedometer, smartwatch, GPS system, etc. External devices 850 may be connected to the in-vehicle computing system via communication link 836 which may be wired or wireless, as discussed with reference to communication link 830, and configured to provide two-way communication between the external devices and the in-vehicle computing system. For example, external devices 850 may include one or more sensors and communication link 836 may transmit sensor output from external devices 850 to in-vehicle computing system 809 and touch screen 808. External devices 850 may also store and/or receive information regarding navigational map data, image feature mapping data, etc. and may transmit such information from the external devices 850 to in-vehicle computing system 809 and/or touch screen 808.

In-vehicle computing system 809 may analyze the input received from external devices 850, mobile device 828, and/or other input sources and provide output via touch screen 808 and/or speakers 812, communicate with mobile device 828 and/or external devices 850, and/or perform other actions based on the assessment. In some embodiments, all or a portion of the assessment may be performed by the mobile device 828 and/or the external devices 850. In some embodiments, the external devices 850 may include in-vehicle computing devices of another vehicle.

In some embodiments, one or more of the external devices 850 may be communicatively coupled to in-vehicle computing system 809 indirectly, via mobile device 828 and/or another of the external devices 850. For example, communication link 836 may communicatively couple external devices 850 to mobile device 828 such that output from external devices 850 is relayed to mobile device 828. Data received from external devices 850 may then be aggregated at mobile device 828 with data collected by mobile device 828, the aggregated data then transmitted to in-vehicle computing system 809 and touch screen 808 via communication link 830. Similar data aggregation may occur at a server system and then transmitted to in-vehicle computing system 809 and touch screen 808 via communication link 836/830.

FIG. 9 shows a block diagram of an in-vehicle computing system 900 configured and/or integrated inside vehicle 901. In-vehicle computing system 900 may be an example of in-vehicle computing system 809 of FIG. 8 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 901 in order to enhance an in-vehicle experience for a driver and/or a passenger.

In-vehicle computing system 900 may include one or more processors including an operating system processor 914 and an interface processor 920. Operating system processor 914 may execute an operating system on the in-vehicle computing system, and control input/output, display, playback, and other operations of the in-vehicle computing system. Interface processor 920 may interface with a vehicle control system 930 via an intra-vehicle communication module 922.

Intra-vehicle communication module 922 may output data to other vehicle systems 931 and vehicle control elements 961, while also receiving data input from other vehicle components and systems 931, 961, e.g., by way of vehicle control system 930. When outputting data, intra-vehicle communication module 922 may provide a signal via a bus corresponding to any status of the vehicle, the vehicle surroundings (e.g., as measured by one or more microphones or cameras mounted on the vehicle), or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), and digital signals propagated through vehicle data networks (such as an engine controller area network [CAN] bus through which engine related information may be communicated and/or an audio-video bridging [AVB] network through which vehicle information may be communicated). For example, the in-vehicle computing system may retrieve from the engine CAN bus (or from an on-board diagnostics device that receives information from the CAN bus) the current speed of the vehicle estimated by the wheel sensors, a current location of the vehicle provided by the GPS sensors, a current acceleration of the vehicle provided by one or more inertial measurement sensors, and/or other information indicative of driving behaviors (e.g., actions performed by a driver that affect a way in which the vehicle is operated) of a driver. In addition, other interfacing mechanisms such as Ethernet may be used without departing from the scope of this disclosure.

A non-volatile storage device 908 may be included in in-vehicle computing system 900 to store data such as instructions executable by processors 914 and 920 in non-volatile form. The storage device 908 may store application data to enable the in-vehicle computing system 900 to perform any of the above-described methods and/or to run an application for connecting to a cloud-based server and/or collecting information for transmission to the cloud-based server. Connection to a cloud-based server may be mediated via extra-vehicle communication module 924. The application may retrieve information gathered by vehicle systems/sensors, input devices (e.g., user interface 918), devices in communication with the in-vehicle computing system (e.g., a mobile device connected via a Bluetooth link), etc. In-vehicle computing system 900 may further include a volatile memory 916. Volatile memory 916 may be random access memory (RAM). Non-transitory storage devices, such as non-volatile storage device 908 and/or volatile memory 916, may store instructions and/or code that, when executed by a processor (e.g., operating system processor 914 and/or interface processor 920), controls the in-vehicle computing system 900 to perform one or more of the actions described in the disclosure.

A microphone 902 may be included in the in-vehicle computing system 900 to measure ambient noise in the vehicle, to measure ambient noise outside the vehicle, etc. One or more additional sensors may be included in and/or communicatively coupled to a sensor subsystem 910 of the in-vehicle computing system 900. For example, the sensor subsystem 910 may include and/or be communicatively coupled to a camera, such as a rear view camera for assisting a user in parking the vehicle, a cabin camera for identifying a user, and/or a front view camera to assess quality of the route segment ahead. Sensor subsystem 910 of in-vehicle computing system 900 may communicate with and receive inputs from various vehicle sensors and may further receive user inputs. While certain vehicle system sensors may communicate with sensor subsystem 910 alone, other sensors may communicate with both sensor subsystem 910 and vehicle control system 930, or may communicate with sensor subsystem 910 indirectly via vehicle control system 930. Sensor subsystem 910 may serve as an interface (e.g., a hardware interface) and/or processing unit for receiving and/or processing received signals from one or more of the sensors described in the disclosure.

A navigation subsystem 911 of in-vehicle computing system 900 may generate and/or receive navigation information such as location information (e.g., via a GPS sensor and/or other sensors from sensor subsystem 910), route guidance, traffic information, point-of-interest (POI) identification, and/or provide other navigational services for the driver. The navigation subsystem 911 may include an inertial navigation system that may further determine a position, orientation, and velocity of the vehicle via motion and rotation sensor inputs. Examples of motion sensors include accelerometers, and examples of rotation sensors include gyroscopes. The navigation subsystem 911 may communicate with motion and rotation sensors included in the sensor subsystem 910. Alternatively, the navigation subsystem 911 may include motion and rotation sensors and determine the movement and rotation based on the output of these sensors. Navigation subsystem 911 may transmit data to, and receive data from a cloud-based server and/or external navigation service via extra-vehicle communication module 924.

External device interface 912 of in-vehicle computing system 900 may be coupleable to and/or communicate with one or more external devices 940 located external to vehicle 901. While the external devices are illustrated as being located external to vehicle 901, it is to be understood that they may be temporarily housed in vehicle 901, such as when the user is operating the external devices while operating vehicle 901. In other words, the external devices 940 are not integral to vehicle 901. The external devices 940 may include a mobile device 942 (e.g., connected via a Bluetooth, NFC, WIFI direct, or other wireless connection) or an alternate Bluetooth-enabled device 952. Mobile device 942 may be a mobile phone, smart phone, wearable devices/sensors that may communicate with the in-vehicle computing system via wired and/or wireless communication, or other portable electronic device(s). Other external devices include external services 946. For example, the external devices may include extra-vehicular devices that are separate from and located externally to the vehicle. Still other external devices include external storage devices 954, such as solid-state drives, pen drives, USB drives, etc. External devices 940 may communicate with in-vehicle computing system 900 either wirelessly or via connectors without departing from the scope of this disclosure. For example, external devices 940 may communicate with in-vehicle computing system 900 through the external device interface 912 over network 960, a universal serial bus (USB) connection, a direct wired connection, a direct wireless connection, and/or other communication link.

One or more applications 944 may be operable on mobile device 942. As an example, mobile device application 944 may be operated to monitor an environment of the vehicle (e.g., collect audio and/or visual data of an environment of the vehicle) and/or to process audio and/or visual data received from vehicle sensors. The collected/processed data may be transferred by application 944 to external device interface 912 over network 960. Likewise, one or more applications 948 may be operable on external services 946. As an example, external services applications 948 may be operated to aggregate and/or analyze data from multiple data sources. For example, external services applications 948 may aggregate data from the in-vehicle computing system (e.g., sensor data, log files, user input, etc.), etc. The collected data may be transmitted to another device and/or analyzed by the application to identify a driver using cloud-based data (e.g., driver profiles stored externally to the vehicle).

Vehicle control system 930 may include controls for controlling aspects of various vehicle systems 931 involved in different in-vehicle functions. These may include, for example, controlling aspects of vehicle audio system 932 for providing audio output to the vehicle occupants. Audio system 932 may include one or more acoustic reproduction devices including electromagnetic transducers such as speakers. In some examples, in-vehicle computing system 900 may be the only audio source for the acoustic reproduction device or there may be other audio sources that are connected to the audio reproduction system (e.g., external devices such as a mobile phone) to produce audio outputs, such as one or more of the audible alerts described above. The connection of any such external devices to the audio reproduction device may be analog, digital, or any combination of analog and digital technologies.

Vehicle control system 930 may also include controls for adjusting the settings of various vehicle controls 961 (or vehicle system control elements) related to the engine and/or auxiliary elements within a cabin of the vehicle, such as steering controls 962, brake controls 963, lighting controls 964 (e.g., cabin lighting, external vehicle lighting, light signals). Vehicle controls 961 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system (e.g., to provide the above-described alert). The control signals may also control audio output at one or more speakers of the vehicle's audio system 932.

In-vehicle computing system 900 may further include an antenna(s) 906, which may be communicatively coupled to external device interface 912 and/or extra-vehicle-communication module 924. The in-vehicle computing system may receive positioning signals such as GPS signals and/or wireless commands via antenna(s) 906 or via infrared or other mechanisms through appropriate receiving devices.

One or more elements of the in-vehicle computing system 900 may be controlled by a user via user interface 918. User interface 918 may include a graphical user interface presented on a touch screen, such as touch screen 808 of FIG. 8, and/or user-actuated buttons, switches, knobs, dials, sliders, etc. For example, user-actuated elements may include steering wheel controls, door and/or window controls, instrument panel controls, audio system settings, climate control system settings, route/route segment quality preference, route/route segment avoidance preference, and the like. A user may also interact with one or more applications of the in-vehicle computing system 900 and mobile device 942 via user interface 918. Notifications and other messages (e.g., driver identification results, as shown in FIGS. 6A, 6B, and 7 and/or graphical representations of driving profile matrices, as shown in FIG. 3), as well as navigational assistance, may be displayed to the user on a display of the user interface. User preferences/information and/or responses to presented information may be performed via user input to the user interface.

The disclosure also provides for an in-vehicle computing system of a vehicle, the in-vehicle computing system including a sensor interface communicatively coupled to one or more data collection devices, a processor, and a storage device storing instructions executable by the processor to generate a two-dimensional current driver profile matrix for a current driver of the vehicle, the current driver profile matrix indicating a vehicle operating status in terms of a pair of driving parameters at sampled times during a current vehicle trip, and determine a probability that the current driver is one of a plurality of known drivers by comparing the current driver profile matrix to one or more stored driver profile matrices associated with the plurality of known drivers. In a first example of the in-vehicle computing system, the pair of driving parameters may additionally or alternatively include a speed of the vehicle and at least one of an acceleration, a gear, an engine RPM, and an accelerator pedal position of the vehicle. A second example of the in-vehicle computing system optionally includes the first example, and further includes the in-vehicle computing system, wherein the instructions are further executable by the processor to generate a plurality of two-dimensional current driver profile matrices, each current driver profile matrix indicating the vehicle operating status in terms of a different pair of driving parameters at the sampled times during the current vehicle trip. A third example of the in-vehicle computing system optionally includes one or both of the first example and the second example, and further includes the in-vehicle computing system, wherein at least one driving parameter of the pair of driving parameters is received from an on-board diagnostics device. A fourth example of the in-vehicle computing system optionally includes one or more of the first through the third examples, and further includes the in-vehicle computing system, wherein each driving parameter of the pair of driving parameters is received from the on-board diagnostics device, or wherein a first driving parameter of the pair of driving parameters is received from the on-board diagnostics device and a second driving parameter of the pair of driving parameters is received from an inertial measurement unit. A fifth example of the in-vehicle computing system optionally includes one or more of the first through the fourth examples, and further includes the in-vehicle computing system, wherein the pair of driving parameters includes a vehicle speed and a vehicle acceleration, and wherein the instructions are further executable to generate a second current driver profile matrix indicating the vehicle operating status in terms of the vehicle speed and only vehicle accelerations that are above a non-zero threshold acceleration value at the sampled times during the current vehicle trip. A sixth example of the in-vehicle computing system optionally includes one or more of the first through the fifth examples, and further includes the in-vehicle computing system, wherein the instructions are further executable to generate a third current driver profile matrix indicating the vehicle operating status in terms of a vehicle speed and vehicle accelerations of the sample times that are recorded when a vehicle speed has changed from respective immediately prior sample times during the current vehicle trip. A seventh example of the in-vehicle computing system optionally includes one or more of the first through the sixth examples, and further includes the in-vehicle computing system, wherein the instructions are further executable to generate a fourth current driver profile matrix indicating the vehicle operating status in terms of a vehicle speed and average vehicle accelerations for each accelerating or decelerating interval of the current trip. An eighth example of the in-vehicle computing system optionally includes one or more of the first through the seventh examples, and further includes the in-vehicle computing system, wherein the instructions are further executable to generate a fifth current driver profile matrix indicating the vehicle operating status in terms of a vehicle speed and a lateral acceleration of the vehicle at the sampled times during the vehicle trip. A ninth example of the in-vehicle computing system optionally includes one or more of the first through the eighth examples, and further includes the in-vehicle computing system, wherein the instructions are further executable to generate a sixth current driver profile matrix indicating the vehicle operating status in terms of vehicle speed and lateral vehicle accelerations that are higher than a threshold at the sampled times during the vehicle trip. A tenth example of the in-vehicle computing system optionally includes one or more of the first through the ninth examples, and further includes the in-vehicle computing system, wherein the instructions are further executable to generate a seventh current driver profile matrix indicating the vehicle operating status in terms of an accelerator pedal position and a first derivative of the accelerator pedal position at the sampled times during the vehicle trip. An eleventh example of the in-vehicle computing system optionally includes one or more of the first through the tenth examples, and further includes the in-vehicle computing system, wherein the instructions are further executable to determine the probability that the current driver is one of the plurality of known drivers by comparing each of a plurality of current driver profile matrices to respective one or more stored driver profile matrices associated with the plurality of known drivers.

The disclosure also provides for a method of inferring an identity of a driver of a vehicle with a driver identification system, the method including adjusting a vehicle parameter responsive to an automatic identification of a driver of the vehicle from among a limited number of drivers, the automatic identification based upon a probability correlation of at least two driving parameters sampled repeatedly over time during a current vehicle trip to stored data associated with the limited number of drivers based on one or more previous drives. In a first example of the method, the one or more previous drives may additionally or alternatively include one or more previous vehicle trips of the vehicle. A second example of the method optionally includes the first example, and further includes the method, wherein the automatic identification includes generating, with a processor of the driver identification system, a two-dimensional current driver profile matrix for the driver of the vehicle, the current driver profile matrix indicating a vehicle operating status in terms of the at least two driving parameters sampled repeatedly over time during the current vehicle trip, and determining, with the driver identification system for each respective driver of the limited number of drivers, a probability that the driver is the respective driver by comparing the current driver profile matrix to one or more stored driver profile matrices associated with the respective driver. A third example of the method optionally includes one or both of the first example and the second example, and further includes the method, wherein determining the probability that the driver is the respective driver of the limited number of drivers includes, for each stored driver profile matrix associated with the respective driver, converting the stored driver profile matrix to the respective probability matrix by dividing each cell of the stored driver profile matrix by a maximum value of cells in a same row as the cell that are within a threshold number of cells to the left and right of the cell. A fourth example of the method optionally includes one or more of the first through the third examples, and further includes the method, further comprising, for each stored driver profile matrix, multiplying each cell of the current driver profile matrix by a corresponding cell of the probability matrix for that stored driver profile matrix to determine a calculated product, summing the calculated products for each cell of the current driver profile matrix to determine a calculated sum, and dividing the calculated sum by a sum of all cells from the current driver profile matrix to determine a probability that the driver is the respective driver associated with that stored driver profile matrix and aggregating probabilities of each stored driver profile matrix for that stored driver profile to determine an overall probability that the driver is the respective driver associated with that stored driver profile. In a fifth example of the method, plurality of known drivers may additionally or alternatively be associated with a stored driver profile comprising a plurality of stored driver profile matrices associated with the respective known driver, and determining the probability that the current driver is one of the plurality of known drivers may additionally or alternatively include converting each of the one or more stored driver profile matrices associated with the plurality of known drivers to a respective probability matrix. A sixth example of the method optionally includes one or more of the first through the fifth examples, and further includes the method, wherein for each stored driver profile matrix, converting the stored driver profile matrix to the respective probability matrix includes dividing each cell of the stored driver profile matrix by a maximum value of cells in a same row as the cell that are within a threshold number of cells to the left and right of the cell. A seventh example of the method optionally includes one or more of the first through the sixth examples, and further includes the method, further comprising, for each stored driver profile matrix, multiplying each cell of the current driver profile matrix by a corresponding cell of the probability matrix for that stored driver profile matrix to determine a calculated product, summing the calculated products for each cell of the current driver profile matrix to determine a calculated sum, and dividing the calculated sum by a sum of all cells from the current driver profile matrix to determine a probability that a current driver is the known driver associated with that stored driver profile matrix. An eighth example of the method optionally includes one or more of the first through the seventh examples, and further includes the method, further comprising, for each stored driver profile, aggregating probabilities of each stored driver profile matrix for that stored driver profile to determine an overall probability that the current driver is the respective known driver associated with that stored driver profile.

The disclosure also provides for a driver identification system of a vehicle, the driver identification system comprising a display, a sensor interface communicatively coupled to one or more data collection devices, a processor, and a storage device storing instructions executable by the processor to receive, via the sensor interface, driving data from the one or more data collection devices, the driving data including an indication of parameters of a vehicle operating status during a vehicle trip, generate a current driver profile matrix for a current driver of the vehicle, the current driver profile matrix mapping values of a first parameter of the vehicle operating status to values of a second parameter of the vehicle operating status using the driving data, compare the current driver profile matrix to one or more stored driver profile matrices, each of the one or more stored driver profile matrices associated with a respective known driver, for each respective known driver, determine a probability that the current driver is the respective known driver, and output, via the display, an indication of a driver identifier associated with a selected known driver, wherein the probability that the current driver is the selected known driver is higher than the probability that the current driver is any other one of the respective known drivers. In a first example of the driver identification system, the instructions may additionally or alternatively be further executable by the processor to output, via the display, an indication of the probability that the current driver is the selected known driver. A second example of the driver identification system optionally includes the first example, and further includes the driver identification system, wherein the instructions are further executable to determine the probability that the current driver is one of the respective known drivers by comparing, for each respective known driver, each of a plurality of current driver profile matrices to a respective stored driver profile matrix associated with the respective known driver, and wherein the instructions are further executable to transmit an indication of the probability that the current driver is the selected known driver to a remote server device outside of the vehicle (e.g., a remote server device located remotely from the vehicle). A third example of the driver identification system optionally includes one or both of the first example and the second example, and further includes the driver identification system, wherein the instructions are further executable by the processor to output, via the display, a visual representation of the current driver profile matrix and at least one of the stored driver profile matrices associated with the respective known drivers. A fourth example of the driver identification system optionally includes one or more of the first through the third examples, and further includes the driver identification system, wherein the visual representation of the current driver profile matrix and the at least one of the stored driver profile matrices is presented on a user interface that includes an interactive element selectable to control the driver identification system to update a selected one of the stored driver profile matrices to include the driving data for the vehicle trip. A fifth example of the driver identification system optionally includes one or more of the first through the fourth examples, and further includes the driver identification system, wherein the visual representation of the current driver profile matrix and the at least one of the stored driver profile matrices includes an indication of the determined probability that a current driver is the respective known driver associated with the at least one of the stored driver profile matrices.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 809 and/or 900 described with reference to FIGS. 8 and 9. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. An in-vehicle computing system of a vehicle, the in-vehicle computing system comprising:
a sensor interface communicatively coupled to one or more data collection devices;
a processor; and
a storage device storing instructions executable by the processor to:
generate a two-dimensional current driver profile matrix for a current driver of the vehicle, the current driver profile matrix indicating a vehicle operating status in terms of a pair of driving parameters at sampled times during a current vehicle trip, each cell of the current driver profile matrix including a counter that is incremented each time the vehicle is observed operating at the values associated with that cell of a first parameter of the pair of driving parameters and a second parameter of the pair of driving parameters;
determine a probability that the current driver is one of a plurality of known drivers by comparing the current driver profile matrix to one or more stored driver profile matrices associated with the plurality of known drivers; and
adjust a vehicle parameter responsive to the determination that the current driver is one of the plurality of known drivers.

2. The in-vehicle computing system of claim 1, wherein the pair of driving parameters includes a speed of the vehicle and at least one of an acceleration, a gear, an engine RPM, and an accelerator pedal position of the vehicle.

3. The in-vehicle computing system of claim 1, wherein the instructions are further executable by the processor to:
generate a plurality of two-dimensional current driver profile matrices, each current driver profile matrix indicating a vehicle operating status in terms of a different pair of driving parameters at the sampled times during the current vehicle trip.

4. The in-vehicle computing system of claim 1, wherein at least one driving parameter of the pair of driving parameters is received from an on-board diagnostics device.

5. The in-vehicle computing system of claim 4, wherein each driving parameter of the pair of driving parameters is received from the on-board diagnostics device.

6. The in-vehicle computing system of claim 1, wherein the pair of driving parameters includes a vehicle speed and a vehicle acceleration, and wherein the instructions are further executable by the processor to:
generate a second current driver profile matrix indicating a vehicle operating status in terms of the vehicle speed and only vehicle accelerations that are above a non-zero threshold acceleration value at the sampled times during the current vehicle trip.

7. The in-vehicle computing system of claim 1, wherein the instructions are further executable by the processor to:
generate an additional current driver profile matrix indicating a vehicle operating status in terms of a vehicle speed and vehicle accelerations of sample times that are recorded when a vehicle speed has changed from respective immediately prior sample times during the current vehicle trip.

8. The in-vehicle computing system of claim 1, wherein the instructions are further executable by the processor to:
generate an additional current driver profile matrix indicating a vehicle operating status in terms of a vehicle speed and average vehicle accelerations for each accelerating or decelerating interval of the current vehicle trip.

9. The in-vehicle computing system of claim 1, wherein the instructions are further executable by the processor to:
generate an additional current driver profile matrix indicating a vehicle operating status in terms of a vehicle speed and a lateral acceleration of the vehicle at the sampled times during the current vehicle trip.

10. The in-vehicle computing system of claim 1, wherein the instructions are further executable by the processor to:
generate an additional current driver profile matrix indicating a vehicle operating status in terms of vehicle speed and lateral vehicle accelerations that are higher than a threshold at the sampled times during the current vehicle trip.

11. The in-vehicle computing system of claim 1, wherein the instructions are further executable by the processor to:
generate an additional current driver profile matrix indicating a vehicle operating status in terms of an accelerator pedal position and a first derivative of the accelerator pedal position at the sampled times during the current vehicle trip.

12. The in-vehicle computing system of claim 1, wherein the instructions are further executable by the processor to:
determine the probability that the current driver is one of the plurality of known drivers by comparing each of a plurality of current driver profile matrices to one or more respective stored driver profile matrices associated with the plurality of known drivers.

13. A method of inferring an identity of a driver of a vehicle with a driver identification system, the method including:
generating, with a processor of the driver identification system, a two-dimensional current driver profile matrix for the driver of the vehicle, the current driver profile matrix indicating a vehicle operating status in terms of counts of the vehicle operating at values of at least two driving parameters sampled repeatedly over time during a current vehicle trip; and
adjusting a vehicle parameter responsive to an automatic identification of the driver of the vehicle from among a limited number of drivers, the automatic identification based upon a probability correlation of the at least two driving parameters sampled repeatedly over time during the current vehicle trip to stored data associated with the limited number of drivers based on one or more previous drives,
wherein the adjustment of the vehicle parameter includes controlling one or more vehicle systems.

14. The method of claim 13, wherein the one or more previous drives include one or more previous vehicle trips of the vehicle.

15. The method of claim 13, wherein the automatic identification includes:
determining, with the driver identification system, for each respective driver of the limited number of drivers, a probability that the driver is the respective driver of the limited number of drivers by comparing the current driver profile matrix to one or more stored driver profile matrices associated with the respective driver.

16. The method of claim 15, wherein determining the probability that the driver is the respective driver of the limited number of drivers includes:
for each of the one or more stored driver profile matrices associated with the respective driver, converting the stored driver profile matrix to a respective probability matrix by dividing each cell of the stored driver profile matrix by a maximum value of cells in a same row as the cell that are within a threshold number of cells to the left of the cell and to right of the cell.

17. The method of claim 16, further comprising:
for each of the one or more stored driver profile matrices associated with the respective driver,
multiplying each cell of the current driver profile matrix by a corresponding cell of a probability matrix for that stored driver profile matrix to determine a calculated product,
summing the calculated products for each cell of the current driver profile matrix to determine a calculated sum, and
dividing the calculated sum by a sum of all cells from the current driver profile matrix to determine a probability that the driver is the respective driver associated with that stored driver profile matrix; and
aggregating probabilities of each stored driver profile matrix for that stored driver profile to determine an overall probability that the driver is the respective driver associated with that stored driver profile.

18. A driver identification system of a vehicle, the driver identification system comprising:
a display;
a sensor interface communicatively coupled to one or more data collection devices;
a processor; and
a storage device storing instructions executable by the processor to:
receive, via the sensor interface, driving data from the one or more data collection devices, the driving data including an indication of parameters of a vehicle operating status during a vehicle trip;
generate a two-dimensional current driver profile matrix for a current driver of the vehicle, the two-dimensional current driver profile matrix mapping values of a first parameter of the vehicle operating status to values of a second parameter of the vehicle operating status using the driving data, each cell of the current driver profile matrix including a counter that is incremented each time the vehicle is observed operating at the values associated with that cell of the first parameter and the second parameter, and the current driver profile matrix indicating the vehicle operating status in terms of counts of the vehicle operating at values of at least the first parameter and the second parameter sampled repeatedly over time during the vehicle trip;
compare the two-dimensional current driver profile matrix to one or more two-dimensional stored driver profile matrices, each of the one or more two-dimensional stored driver profile matrices associated with a respective known driver;
for each respective known driver, determine a probability that the current driver is the respective known driver;
output, via the display, an indication of a driver identifier associated with a selected known driver, wherein the probability that the current driver is the selected known driver is higher than the probability that the current driver is any other one of the respective known drivers; and
adjust a vehicle parameter responsive to the indication of the selected known driver.

19. The driver identification system of claim 18, wherein the instructions are further executable by the processor to:
output, via the display, an indication of the probability that the current driver is the selected known driver.

20. The driver identification system of claim 18, wherein the instructions are further executable by the processor to:
determine the probability that the current driver is one of the respective known drivers by comparing, for each respective known driver, each of a plurality of two-dimensional current driver profile matrices to a respective two-dimensional stored driver profile matrix associated with the respective known driver,
wherein the instructions are further executable to transmit an indication of the probability that the current driver is the selected known driver to a remote server device outside of the vehicle.

* * * * *